(12) United States Patent
Blankenship et al.

(10) Patent No.: US 12,376,110 B2
(45) Date of Patent: Jul. 29, 2025

(54) METHODS OF SIGNALING RESERVED RESOURCES FOR ULTRA-RELIABLE LOW LATENCY COMMUNICATION (URLLC) TRAFFIC

(71) Applicant: Telefonaktiebolaget LM Ericsson (publ), Stockholm (SE)

(72) Inventors: Yufei Blankenship, Kildeer, IL (US); Mattias Andersson, Sundbyberg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 797 days.

(21) Appl. No.: 17/280,241

(22) PCT Filed: Sep. 24, 2019

(86) PCT No.: PCT/IB2019/058093
§ 371 (c)(1),
(2) Date: Mar. 26, 2021

(87) PCT Pub. No.: WO2020/065529
PCT Pub. Date: Apr. 2, 2020

(65) Prior Publication Data
US 2021/0345319 A1    Nov. 4, 2021

Related U.S. Application Data

(60) Provisional application No. 62/738,512, filed on Sep. 28, 2018.

(51) Int. Cl.
*H04W 72/21* (2023.01)

(52) U.S. Cl.
CPC .................. *H04W 72/21* (2023.01)

(58) Field of Classification Search
CPC ... H04W 72/21; H04W 72/23; H04W 72/543; H04L 1/1671; H04L 1/08; H04L 1/1685;
(Continued)

(56) References Cited

U.S. PATENT DOCUMENTS 10,187,183 B2 *  1/2019  Islam .................. H04L 1/16
10,568,129 B2 *  2/2020  Jeon .................. H04W 72/0446
(Continued)

FOREIGN PATENT DOCUMENTS

CN    108207032 A    6/2018
CN    108352970 A    7/2018
(Continued)

OTHER PUBLICATIONS

Huawei et al., "On multiple resource configuration for UL grant-free transmission", 3GPP TSG RAN WG1 NR Ad-Hoc #3, R1-1715420, Nagoya, Japan, Sep. 18-21, 2017 (8 pages).
(Continued)

*Primary Examiner* — Brian T O Connor
(74) *Attorney, Agent, or Firm* — Rothwell, Figg, Ernst & Manbeck, P.C.

(57) ABSTRACT

A set of resources, e.g. time and frequency resources, used for configured grants for a group of user equipments (UEs) is signalled to a second group of UEs. The second group of
(Continued)

UEs consider the signalled set of resources to be reserved, and, therefore, avoid transmitting anything on the set of resources even if they are scheduled to do so.

16 Claims, 23 Drawing Sheets

(58) Field of Classification Search
 CPC ..... H04L 1/1819; H04L 1/189; H04L 1/1893; H04L 1/1887; H04L 1/1812
 See application file for complete search history.

(56) References Cited

U.S. PATENT DOCUMENTS

| | | | |
|---|---|---|---|
| 10,645,713 | B2 | 5/2020 | Lindhoff et al. |
| 10,951,377 | B2* | 3/2021 | Yi .................. H04W 72/0446 |
| 11,147,064 | B2* | 10/2021 | Babaei .................. H04W 72/02 |
| 11,291,031 | B2* | 3/2022 | Bae .................. H04L 5/0053 |
| 11,411,682 | B2* | 8/2022 | Jeon .................. H04W 72/23 |
| 11,445,540 | B2* | 9/2022 | Goto .................. H04W 72/0446 |
| 11,540,311 | B2* | 12/2022 | Byun .................. H04L 1/0003 |
| 11,546,929 | B2* | 1/2023 | Cao .................. H04L 5/0094 |
| 11,653,365 | B2* | 5/2023 | Babaei .................. H04L 5/0082 370/336 |
| 11,729,782 | B2* | 8/2023 | Zhang .................. H04L 5/0051 370/336 |
| 11,929,954 | B2* | 3/2024 | Matsuda .................. H04L 27/26 |
| 11,950,256 | B2* | 4/2024 | Matsuda .................. H04W 72/20 |
| 2018/0035459 | A1 | 2/2018 | Islam et al. |
| 2018/0042030 | A1 | 2/2018 | Xu et al. |
| 2022/0369362 | A1* | 11/2022 | Goto .................. H04W 72/23 |

FOREIGN PATENT DOCUMENTS

| | | |
|---|---|---|
| RU | 2 658 804 C2 | 6/2018 |
| WO | 2018/019085 A1 | 2/2018 |
| WO | 2018/085485 A1 | 5/2018 |
| WO | 2018/128312 A1 | 7/2018 |
| WO | 2018127201 A1 | 7/2018 |

OTHER PUBLICATIONS

International Search Report and Written Opinion issued in International Application No. PCT/IB2019/058093 dated Dec. 9, 2019 (15 pages).

Intel Corporation, "Multiplexing of UL transmissions with different data durations and latency requirements", vol. RAN WG1, No. Hangzhou; May 15, 2017-May 19, 2017, May 14, 2017 (May 14, 20174), 3GPP Draft; R1-1707415 Intel-URLLC_EMBB_MUX_UL, 3rd Generation Partnership Project (3GPP), Mobile Competence Centre; 650, Route Des Lucioles; F-06921 Sophia-Antipolis Cedex; France (6 pages).

LG Electronics, "Discussion on multiplexing UL transmission with different requirements", vol. RAN WG1, No. Athens, Greece; Feb. 26, 2018-Mar. 2, 2018, Feb. 16, 2018 (Feb. 16, 2018), 3GPP Draft; R1-1802228 Discussion on Multiplexing UL Transmission With Different Requirements, 3rd Generation Partnership Project (3GPP), Mobile Competence Centre; 650, Route Des Lucioles; F-06921 (6 pages).

Institute for Information Industry (III), "Discussion on Inter UE UL multiplexing", vol. RAN WG1, No. Gothenburg, Sweden;Aug. 10, 2018 (Aug. 10, 2018), 3GPP Draft; R1-1808868, 3rd Generation Partnership Project (3GPP), Mobile Competence Centr E; 650, Route Des Lucioles; F-06921 Sophia-Antipolis Cedex; France (3 pages).

Institute for Information Industry (III), "On eMBB and URLLC Uplink Multiplexing", vol. RAN WG1, No. Athens, Greece; Feb. 26, 2018-Mar. 2, 2018, Feb. 14, 2018 (Feb. 14, 2018), 3GPP Draft; R1-1802245 on EMBB and URLLC UL Multiplexing, 3rd Generation Partnership Project (3GPP), Mobile Competence Centre; 650, Route Des Lucioles; F-06921 Sophia-Antipolis Cedex France (3 pages).

Huawei et al., "Support of URLLC in UL", 3GPP TSG RAN WG1 NR Ad Hoc Meeting, R1-1700024, Spokane, Washington, USA, Jan. 16-20, 2017 (16 pages).

Intel Corporation, "Multiplexing of UL transmissions with different data durations and latency requirements", 3GPP TSG RAN WG1 Meeting #89, R1-1707415, Hangzhou, P.R. China May 15-19, 2017 (6 pages).

* cited by examiner

METHODS OF SIGNALING RESERVED RESOURCES FOR ULTRA-RELIABLE LOW LATENCY COMMUNICATION (URLLC) TRAFFIC

CROSS REFERENCE TO RELATED APPLICATION(S)

This application is a 35 U.S.C. § 371 National Stage of International Patent Application No. PCT/IB2019/058093, filed Sep. 24, 2019, which claims priority to U.S. provisional patent application No. 62/738,512, filed Sep. 28, 2018. The above identified applications are incorporated by this reference.

TECHNICAL FIELD

This disclosure is related to signaling reserved resources reserved for certain traffic.

BACKGROUND

RRC Configuration of UL Grant Free Transmission

In 3GPP TS 38.331 V15.1.0 ("TS 38.331), configuration for UL grant free transmission is defined by information element (IE) ConfiguredGrantConfig.

The IE ConfiguredGrantConfig is used to configure uplink transmission without dynamic grant according to two possible schemes. The actual uplink grant may either be configured via RRC (type1) or provided via the PDCCH (addressed to CS-RNTI) (type2).

Table 1 below shows an exemplary ConfiguredGrantConfig information element.

TABLE 1

```
-- ASN1START
-- TAG-CONFIGUREDGRANTCONFIG-START
ConfiguredGrantConfig ::= SEQUENCE {
frequencyHopping          ENUMERATED {mode1, mode2}   OPTIONAL, -- Need S,
cg-DMRS-ConfigurationDMRS-UplinkConfig,
mcs-Table                 ENUMERATED {qam256, spare1}   OPTIONAL, -- Need S
mcs-TableTransformPrecoder   ENUMERATED {qam256, spare1}   OPTIONAL, -- Need S
uci-OnPUSCH               SetupRelease { CG-UCI-OnPUSCH },
resourceAllocation        ENUMERATED {resourceAllocationType0,resourceAllocationType1,dynam-
                          icSwitch},
ibg-Size                  ENUMERATED {config2} OPTIONAL, -- Need S
powerControlLoopToUse     ENUMERATED {n0, n1},
p0-PUSCH-Alpha            P0-PUSCH-AlphaSetId,
transformPrecoder         ENUMERATED {enabled} OPTIONAL, -- Need S
nrofHARQ-Processes        INTEGER(1..16),
repK                      ENUMERATED {n1, n2, n4, n8},
repK-RV                   ENUMERATED {s1-0231, s2-0303, s3-0000} OPTIONAL, -- Cond RepK
periodicity               ENUMERATED {
    sym2, sym7, sym1x14, sym2x14, sym4x14, sym5x14, sym8x14, sym10x14, sym16x14, sym20x14,
    sym32x14, sym40x14, sym64x14, sym80x14, sym128x14, sym160x14, sym256x14, sym320x14,
    sym512x14, sym640x14, sym1024x14, sym1280x14, sym2560x14, sym5120x14,
    sym6, sym1x12, sym2x12, sym4x12, sym5x12, sym8x12, sym10x12, sym16x12, sym20x12, sym32x12,
    sym40x12, sym64x12, sym80x12, sym128x12, sym160x12, sym256x12, sym320x12, sym512x12,
    sym640x12, sym1280x12, sym2560x12
    },
configuredGrantTimer INTEGER (1..64)OPTIONAL, -- Need R
rrc-ConfiguredUplinkGrant SEQUENCE {
    timeDomainOffset       INTEGER (0..5119),
    timeDomainAllocation   INTEGER (0..15),
    frequencyDomainAllocationBIT STRING (SIZE(18)),
    antennaPort            INTEGER (0..31),
    dmrs-SeqInitialization    INTEGER (0..1)   OPTIONAL, -- Cond NoTransformPrecoder
    precodingAndNumberOfLayers INTEGER (0..63),
    srs-ResourceIndicator     INTEGER (0..15),
    mcsAndTBS              INTEGER (0..31),
    frequencyHoppingOffset    INTEGER (1..maxNrofPhysicalResourceBlocks-1) OPTIONAL,- Need M
    pathlossReferenceIndex    INTEGER (0..maxNrofPUSCH-PathlossReferenceRSs-1),
    ...
    } OPTIONAL -- Need R
}
CG-UCI-OnPUSCH ::= CHOICE {
    dynamic SEQUENCE (SIZE (1..4)) OF BetaOffsets,
    semiStatic BetaOffsets
}
-- TAG-CONFIGUREDGRANTCONFIG-STOP
-- ASN1STOP
```

The field descriptions for the ConfiguredGrantConfig information element are listed in table 2 below.

TABLE 2

ConfiguredGrantConfig field descriptions antennaPort

Indicates the antenna port(s) to be used for this configuration, and the maximum bitwidth is 5. See TS 38.214, section 6.1.2, and TS 38.212, section 7.3.1.

cg-DMRS-Configuration

DMRS configuration, corresponds to L1 parameter 'UL-TWG-DMRS' (see TS 38.214, section 6.1.2).

configuredGrantTimer

Indicates the initial value of the configured grant timer (see TS 38.321) in number of periodicities.

frequencyDomainAllocation

Indicates the frequency domain resource allocation, see TS 38.214, section 6.1.2, and TS 38.212, section 7.3.1).

frequencyHopping

Frequency hopping. If not configured, frequency hopping is not configured.

frequencyHoppingOffset

Enables intra-slot frequency hopping with the given frequency hopping offset. Frequency hopping offset used when frequency hopping is enabled. Corresponds to L1 parameter 'Frequency-hopping-offset' (see TS 38.214, section 6.1.2).

mcs-Table

Indicates the MCS table the UE shall use for PUSCH without transform precoding. If the field is absent the UE applies the value 64QAM.

Mcs-TableTransformPrecoder

Indicates the MCS table the UE shall use for PUSCH with transform precoding. If the field is absent the UE applies the value 64QAM.

mcsAndTBS

The modulation order, target code rate and TB size (see TS 38.214, section 6.1.2).

nrofHARQ-Processes

The number of HARQ processes configured. It applies for both Type 1 and Type 2. See TS 38.321, section 5.4.1.

p0-PUSCH-Alpha

Index of the P0-PUSCH-AlphaSet to be used for this configuration.

Periodicity

Periodicity for UL transmission without UL grant for type 1 and type 2. Corresponds to L1 parameter 'UL-TWG-periodicity' (see TS 38.321, section 5.8.2).
The following periodicities are supported depending on the configured subcarrier spacing [symbols]:
15kHz:         2, 7, n*14, where n={1, 2, 4, 5, 8, 10, 16, 20, 32, 40, 64, 80, 128, 160, 320, 640}
30kHz:         2, 7, n*14, where n={1, 2, 4, 5, 8, 10, 16, 20, 32, 40, 64, 80, 128, 160, 256, 320, 640, 1280}
60kHz with normal CP: 2, 7, n*14, where n={1, 2, 4, 5, 8, 10, 16, 20, 32, 40, 64, 80, 128, 160, 256, 320, 512, 640, 1280, 2560}
60kHz with ECP:  2, 6, n*12, where n={1, 2, 4, 5, 8, 10, 16, 20, 32, 40, 64, 80, 128, 160, 256, 320, 512, 640, 1280, 2560}
120kHz:        2, 7, n*14, where n={1, 2, 4, 5, 8, 10, 16, 20, 32, 40, 64, 80, 128, 160, 256, 320, 512, 640, 1024, 1280, 2560, 5120}
(see 38.214, Table 6.1.2.3-1)

powerControlLoopToUse

Closed control loop to apply. Corresponds to L1 parameter 'PUSCH-closed-loop-index' (see TS 38.213, section 7.7.1).

rbg-Size

Selection between config 1 and config 2 for RBG size for PUSCH. When the field is absent the UE applies the value config1. Note: rbg-Size is used when the transformPrecoder parameter is disabled.

repK-RV

If repetitions is used, this field indicates the redundancy version (RV) sequence to use. See TS 38.214, section 6.1.2.

TABLE 2-continued

| ConfiguredGrantConfig field descriptions |
| --- |
| repK |
| The number or repetitions of K. |
| resourceAllocation |
| Configuration of resource allocation type 0 and resource allocation type 1. For Type 1 UL data transmission without grant, +37resourceAllocation" should be resourceAllocationType0 or resourceAllocationType1. |
| Rrc-ConfiguredUplinkGrant |
| Configuration for "configured grant" transmission with fully RRC-configured UL grant (Type1). If this field is absent the UE uses UL grant configured by DCI addressed to CS-RNTI (Type2). Type 1 configured grant may be configured for UL or SUL, but not for both simultaneously. |
| timeDomainAllocation |
| Indicates a combination of start symbol and length and PUSCH mapping type, see TS 38.214, section 6.1.2 and TS 38.212, section 7.3.1. |
| timeDomainOffset |
| Offset related to SFN=0, see TS 38.321, section 5.8.2. |
| transformPrecoder |
| Enable transformer precoder for type1 and type2. If the field is absent, the UE considers the transformer precoder is disabled, see 38.214, section 6.1.3. |
| uci-OnPUSCH |
| Selection between and configuration of dynamic and semi-static beta-offset. For Type 1 UL data transmission without grant, uci-OnPUSCH should be set to semiStatic. |

RRC Configuration of DL Pre-Emption

In TS 38.331 V15.1.0, IE DownlinkPreemption is defined for down link pre-emption.

Table 3 below shows an illustration of an exemplary DownlinkPreemption information element.

TABLE 3

```
-- ASN1 START
-- TAG-DOWNLINKPREEMPTION-START
DownlinkPreemption ::= SEQUENCE {
    int-RNTI                      RNTI-Value,
    timeFrequencySet              ENUMERATED {sea0, set1},
    dci-PayloadSize               INTEGER (0..maxINT-DCI-PayloadSize),
    int-ConfigurationPerServingCell   SEQUENCE (SIZE (1..maxNrofServingCells)) OF
                                      INT-ConfigurationPerServingCell,
    ...
}
INT-ConfigurationPerServingCell :: = SEQUENCE {
    servingCellId                 ServCellIndex,
    positionInDCI                 INTEGER (0..maxINT-DCI-PayloadSize-1)
}
-- TAG-DOWNLINKPREEMPTION-STOP
-- ASN1STOP
```

The field descriptions for the DownlinkPreemption information element are listed in table 4 below.

TABLE 4

| DownlinkPreemption field descriptions |
| --- |
| dci-PayloadSize |
| Total length of the DCI payload scrambled with INT-RNTI. Corresponds to L1 parameter 'INT-DCI-payload-length' (see 38.213, section 11.2) |
| int-ConfigurationPerServingCell |
| Indicates (per serving cell) the position of the 14 bit INT values inside the DCI payload. Corresponds to L1 parameter 'INT-cell-to-INT' and 'cell-to-INT' (see 38.213, section 11.2) |

TABLE 4-continued

DownlinkPreemption field descriptions int-RNTI

RNTI used for indication pre-emption in DL. Corresponds to L1 parameter 'INT-RNTI', where "INT" stands for "interruption" (see 38.213, section 10)

timeFrequencySet

Set selection for DL-preemption indication. Corresponds to L1 parameter 'int-TF-unit' (see 38.213, section 10.1) The set determines how the UE interprets the DL preemption DCI payload.

Traffic Pattern of Certain Typical URLLC Scenarios

For certain URLLC scenarios, the UL traffic pattern is periodic and deterministic with pre-defined arrival interval. This includes prioritized URLLC scenarios such as transport industry, power distribution, and factory automation.

Transport Block Size Determination

In section 6.1.4.2 of 38.214, one step in determining the transport block size for a PUSCH transmission is to determine an approximation of the number of REs available for transmission as follows: a UE determines the total number of REs allocated for PUSCH ($N_{RE}$) by $N_{RE}=$ min $(156, N'_{RE}) \cdot n_{PRB}$ where $n_{PRB}$ is the total number of allocated PRBs for the UE. This number is then used to determine the transport block size.

SUMMARY

There currently exist certain challenge(s). The current design in Rel-15 assumes that uplink traffic is sporadic and unpredictable. There is no design to take into account the traffic types where the UL transmission is periodic and deterministic.

Certain aspects of the present disclosure and their embodiments may provide solutions to these or other challenges. In an aspect there is provided a set of resources, e.g. time and frequency resources, used for configured grants for a group of UEs is signalled to a second group of UEs. The second group of UEs consider the signalled set of resources reserved, and avoid transmitting anything on the set of resources even if they are scheduled to do so.

There are, proposed herein, various embodiments which address one or more of the issues disclosed herein.

In an aspect, there is provided a method performed by a wireless device according to some embodiments. The method includes a step in which the wireless device receives aggregated uplink, UL, information transmitted by a network node, wherein, optionally, the aggregated UL information comprises an indication of an aggregated frequency domain resource and an aggregated time domain resource. The method includes a step in which the wireless device configures an UL transmission based on the aggregated UL information.

In some embodiments, the step of configuring an UL transmission based on the aggregated UL information comprises utilizing, for the UL transmission, frequency and time domain resources other than the aggregated frequency domain resource and the aggregated time domain resource.

In some embodiments, the step of configuring an UL transmission based on the aggregated UL information comprises identifying portions of the UL transmission scheduled to utilize frequency and time domain resources overlapping the aggregated frequency and time domain resource; and removing the identified portions of the UL transmission.

In some embodiments, the step of configuring an UL transmission based on the aggregated UL information comprises identifying a portion of the aggregated frequency and time domain resource allocated to the UE; and utilizing, for the UL transmission, (1) the identified portion of the aggregated frequency and time domain resource and/or (2) frequency and time domain resources other than the aggregated frequency and time domain resource.

In some embodiments, the aggregated UL information comprises a list of UL configurations for two or more UEs. In some embodiments, the aggregated UL information comprises sorted, according to predetermined criteria, UL configurations for two or more UEs. In some embodiments, each of the two or more UEs is capable of URLLC transmission. In some embodiments, the aggregated frequency and time domain resource are reserved for URLLC transmission.

In another aspect, there is provided a method performed by a wireless device according to some embodiments. The method includes a step in which the wireless device sends an uplink, UL, configuration to a network node, wherein the uplink configuration is for being aggregated with a second UL configuration from a second UE into an aggregated information.

In another aspect, there is provided a method performed by a network node according to some embodiments. The method includes a step in which the network node obtains a first uplink, UL, configuration for a first user equipment, UE, and a second UL configuration for a second UE. The method includes a step in which the network node aggregates the first UL and second UL configuration to form an aggregated information. The method includes a step in which the network node transmits the aggregated information, wherein, optionally, the aggregated information comprises an indication of an aggregated frequency domain resource and an aggregated time domain resource.

In some embodiments, the step of aggregating the first UL and second UL configuration comprises listing the first UL configuration and the second UL configuration. In some embodiments, each of the first and second UL configuration comprises one or more parameters that, optionally, may include one or more of a periodicity, a number of configured repetitions, a time domain resource allocation, and a frequency domain resource allocation.

In some embodiments, the step of aggregating the first UL and second UL configuration comprises sorting, according to predetermined criteria, the first UL configuration and the second UL configuration, thereby forming one or more aggregated UL configurations. In some embodiments, the one or more aggregated UL configurations comprise one or more parameters that, optionally, may include one or more of a periodicity, a number of configured repetitions, a time domain resource allocation, and a frequency domain resource allocation.

In some embodiments, the step of transmitting the aggregated information comprises broadcasting the aggregated information to a cell provided by the network node, multicasting the aggregated information to a group of UEs, and/or transmitting the aggregated information to an individual UE.

In some embodiments, the aggregated frequency and time domain resource are reserved for ultra-reliable low latency communication (URLLC) transmission. In some embodiments, each of the first and second UE is capable of URLLC transmission.

Certain embodiments may provide one or more of the following technical advantage(s). The embodiments disclosed herein allow efficient multiplexing of UL URLLC traffic and enhanced mobile broadband (eMBB) traffic.

DETAILED DESCRIPTION

Figure 1:
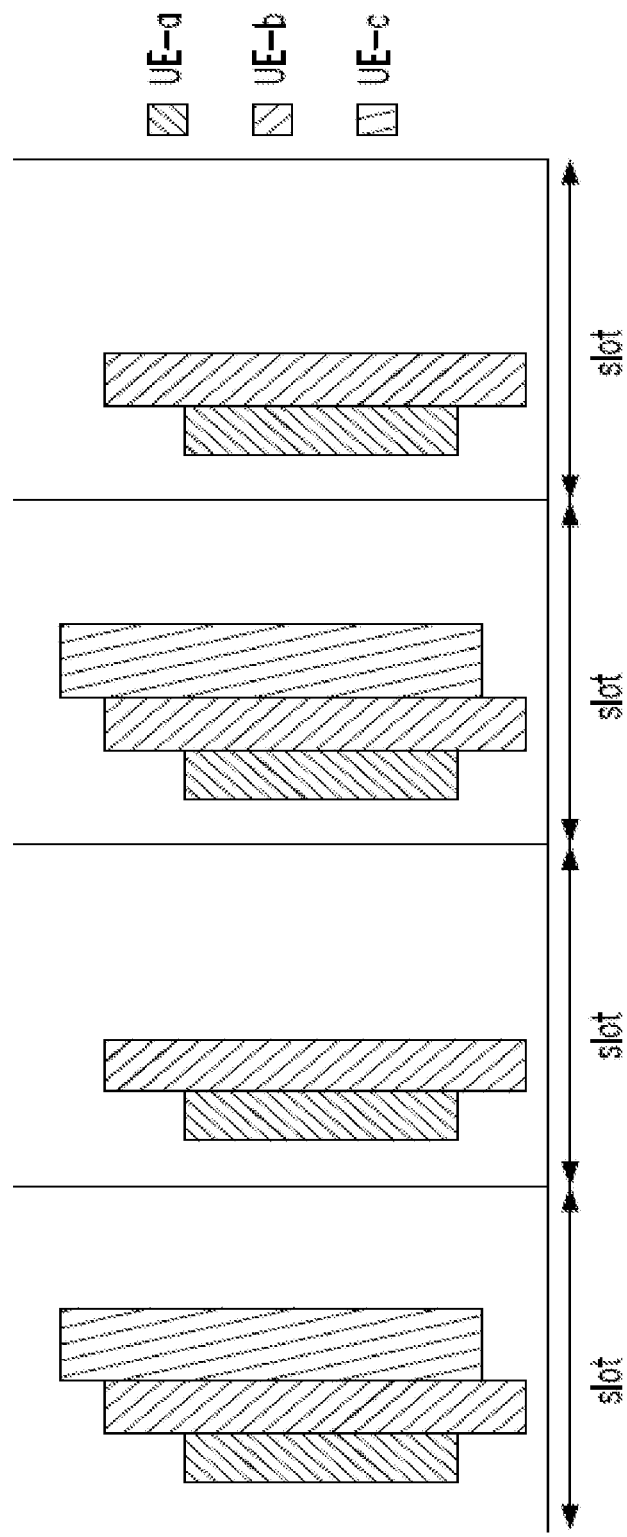
FIG. 1 shows an illustration of predictable UL GF configurations of three example UEs.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In some embodiments, a network node (e.g., a gNB) collects UL configurations from two or more UEs. In such embodiments, each of the UEs transmits an UL configured grant configuration to the network node. The network node aggregates the collected UL grant configurations to form aggregated information, and then sends the aggregated information to one or more UEs. In some embodiments, the network node broadcasts the aggregated information to a cell provided by the network node, multicasts the aggregated information to a group of UE, and/or transmits the aggregated information to an individual UE.

The transmission of the aggregated information may be particularly useful when the UL configured grant configuration is defined for cyclic UL traffic pattern. For example, three exemplary UEs, UE-a, UE-b, and UE-c, are each configured with UL configured grant configurations to support cyclic traffic pattern of URLLC. The network node collects and aggregates the UL configured grant configurations for the UE-a, UE-b, and UE-c to form aggregated information, and sends the aggregated information to exemplary UEs, UE-x and UE-y. UE-x and UE-y may construct UL transmissions based on the received aggregated information.

Signalling Methods of Predictable UL Configured Grant Configurations

Two methods, by way of example and not to be construed as limiting, can be used by the network node to signal aggregated information including predictable UL configured grant configurations (also referred to as predictable UL grant free (GF) configurations).

In a first method (hereinafter referred to as Method A), the network node, e.g., a gNB, signals aggregated information including a list of UL GF configurations.

In Method A, a list of predictable UL GF configurations is RRC configured for each bandwidth part (BWP). Each of the predictable UL GF configurations include one or more parameters that may include one or more: periodicity (P), number of configured repetitions (K), time domain resource allocation, and frequency domain resource allocation.

In some embodiments, one or more parameters may be absent, in which case a default value may be assumed for the absent parameter(s).

FIG. 1 shows an illustration of predictable UL GF configurations of three example UEs: UE-a, UE-b, UE-c, according to one embodiment. An exemplary embodiment of the RRC configuration for the example illustrated in FIG. 1 is shown below in table 5.

TABLE 5

```
UplinkPredictableConfiguredGrantConfig ::= SEQUENCE (SIZE (1..maxNrofPredictableCG))
    OF PredictableConfiguredGrantConfig
}
PredictableConfiguredGrantConfig ::= SEQUENCE {
    repK            ENUMERATED {n1, n2, n4, n8},
    periodicity     ENUMERATED {
                    sym2, sym7, sym1x14, sym2x14, sym4x14, sym5x14, sym8x14,
                    sym10x14, sym16x14, sym20x14,sym32x14, sym40x14, sym64x14,
                    sym80x14, sym128x14, sym160x14, sym256x14, sym320x14,
                    sym512x14, sym640x14, sym1024x14, sym1280x14, sym2560x14,
                    sym5120x14, sym6, sym1x12, sym2x12, sym4x12, sym5x12,
                    sym8x12, sym10x12, sym16x12, sym20x12, sym32x12,
                    sym40x12, sym64x12, sym80x12, sym128x12, sym160x12,
                    sym256x12, sym320x12, sym512x12, sym640x12, sym1280x12,
                    sym2560x12
                    },
    timeDomainOffset           INTEGER (0..5119),
    timeDomainAllocation       INTEGER (0..15),
    frequencyDomainAllocation  BIT STRING (SIZE(18))
}
```

In a second method (hereinafter referred to as Method B), the network node signals aggregated information including aggregated UL GF configurations.

Figure 2:
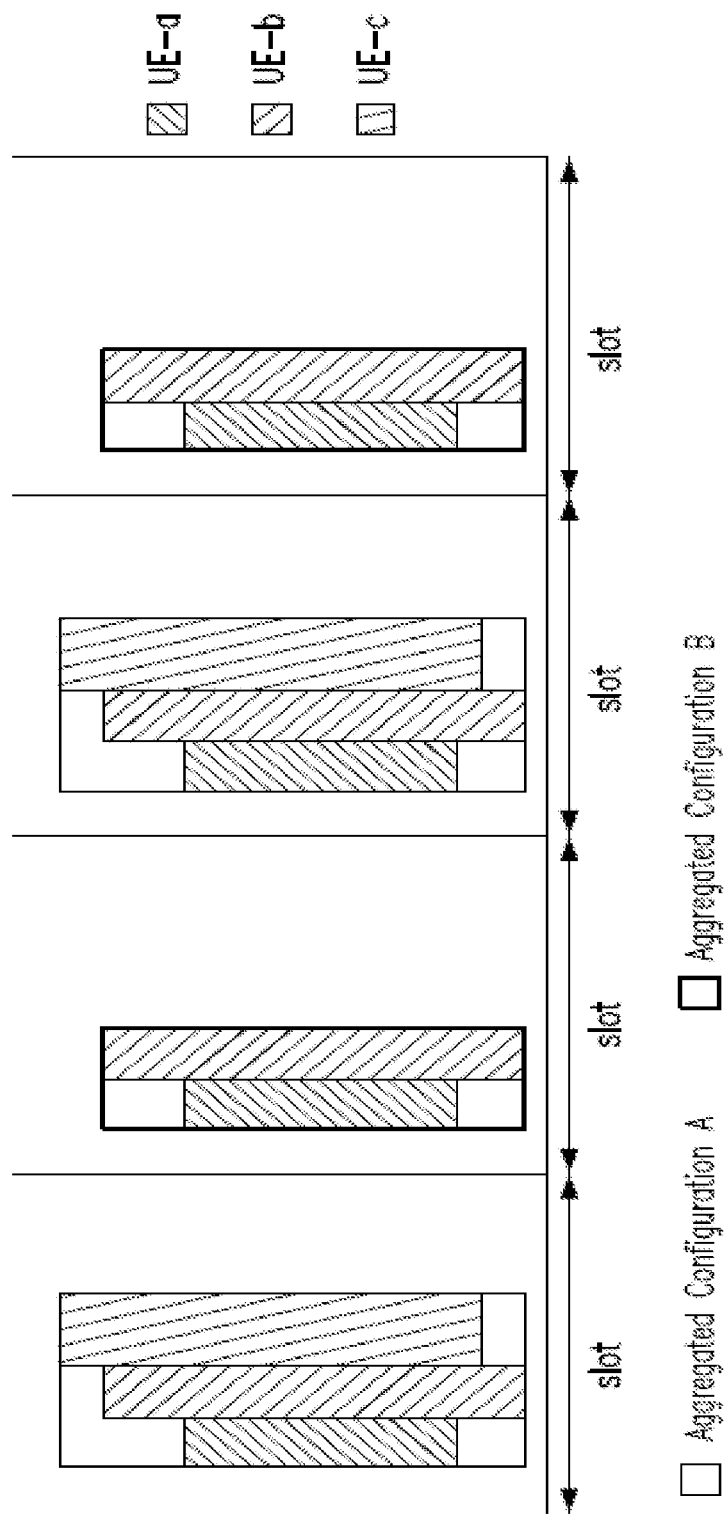
FIG. 2 shows an illustration where the predictable UL GF configurations of three example UEs are aggregated.

In Method B, a total of predictable UL GF configurations are sorted according to predetermined criteria into one time-frequency configuration. FIG. 2 shows an illustration where the predictable UL GF configurations of three example UEs, UE-a, UE-b, UE-c, are aggregated into Aggregated Configuration A and B, according to some embodiments. In some embodiments, the network node signals the RRC configuration of Aggregated Configuration A and B, as shown in table 6 below.

Thus, the eMBB UE avoids transmitting any channel or signal over the reserved resources indicated in the received predictable UL GF configurations.

Methods of constructing eMBB signal while avoiding transmission on the reserved resources include, but is not limited to:

(a) Puncturing scheduled eMBB transmissions overlapping the reserved resources.

The eMBB UE may first construct a sequence of eMBB signals assuming that reserved resources do not exist. Then, when the eMBB UE maps eMMB signals to time-frequency resources, the eMBB UE simply drops

TABLE 6

```
UplinkPredictableConfiguredGrantConfig ::= SEQUENCE (SIZE (1..maxNrofPredicta-
bleCG))
    OF AggregatedConfiguredGrantConfig
}
AggregatedConfiguredGrantConfig ::= SEQUENCE {
    repK                    ENUMERATED {n1, n2, n4, n8},
    periodicity             ENUMERATED {
                            sym2, sym7, sym1x14, sym2x14, sym4x14, sym5x14,
                            sym8x14, sym10x14, sym16x14, sym20x14,
                            sym32x14, sym40x14, sym64x14, sym80x14, sym128x14,
                            sym160x14, sym256x14, sym320x14, sym512x14,
                            sym640x14, sym1024x14, sym1280x14, sym2560x14,
                            sym5120x14, sym6, sym1x12, sym2x12, sym4x12,
                            sym5x12, sym8x12, sym10x12, sym16x12, sym20x12,
                            sym32x12, sym40x12, sym64x12, sym80x12, sym128x12,
                            sym160x12, sym256x12, sym320x12, sym512x12,
                            sym640x12, sym1280x12, sym2560x12
                            },
    timeDomainOffse            INTEGER (0..5119),
    timeDomainAllocation       INTEGER (0..15),
    frequencyDomainAllocation  BIT STRING (SIZE(18))
}
```

Usage of the Signaled UL Configured Grant Configurations

For simplicity, by way of example and not to be construed as limiting, the eMBB UE is used to represent a UE whose UL transmission may be interrupted by a higher priority ULRRC transmission. In some embodiments, other types of UEs (e.g., machine type communication (MTC) UEs) may be UEs with interrupted UL transmission.

In one embodiment, the eMBB UE may utilize the received predictable UL GF configurations to avoid any UL transmission that may overlap with the UL transmission of any URLLC UEs. The eMBB UE may consider the resources of the received predictable UL GF configurations as reserved resources from the perspective of eMBB UE.

the portions of the constructed sequence of eMBB signals that overlap the reserved resources.

(b) Rate match around the reserved resources.

The eMBB UE accounts for the amount of reserved resources when constructing the sequence of eMBB signals. When the eMBB UE maps eMMB signals to time-frequency resources, the reserved resources are avoided and the eMBBs signal are mapped to non-reserved resources. Dropping is not necessary at the resource mapping step when the eMBB UE uses the rate match method.

In terms of usage of non-reserved resources by the eMBB UE, two alternative methods, by way of example and not to be construed as limiting, are shown below.

Figure 3:
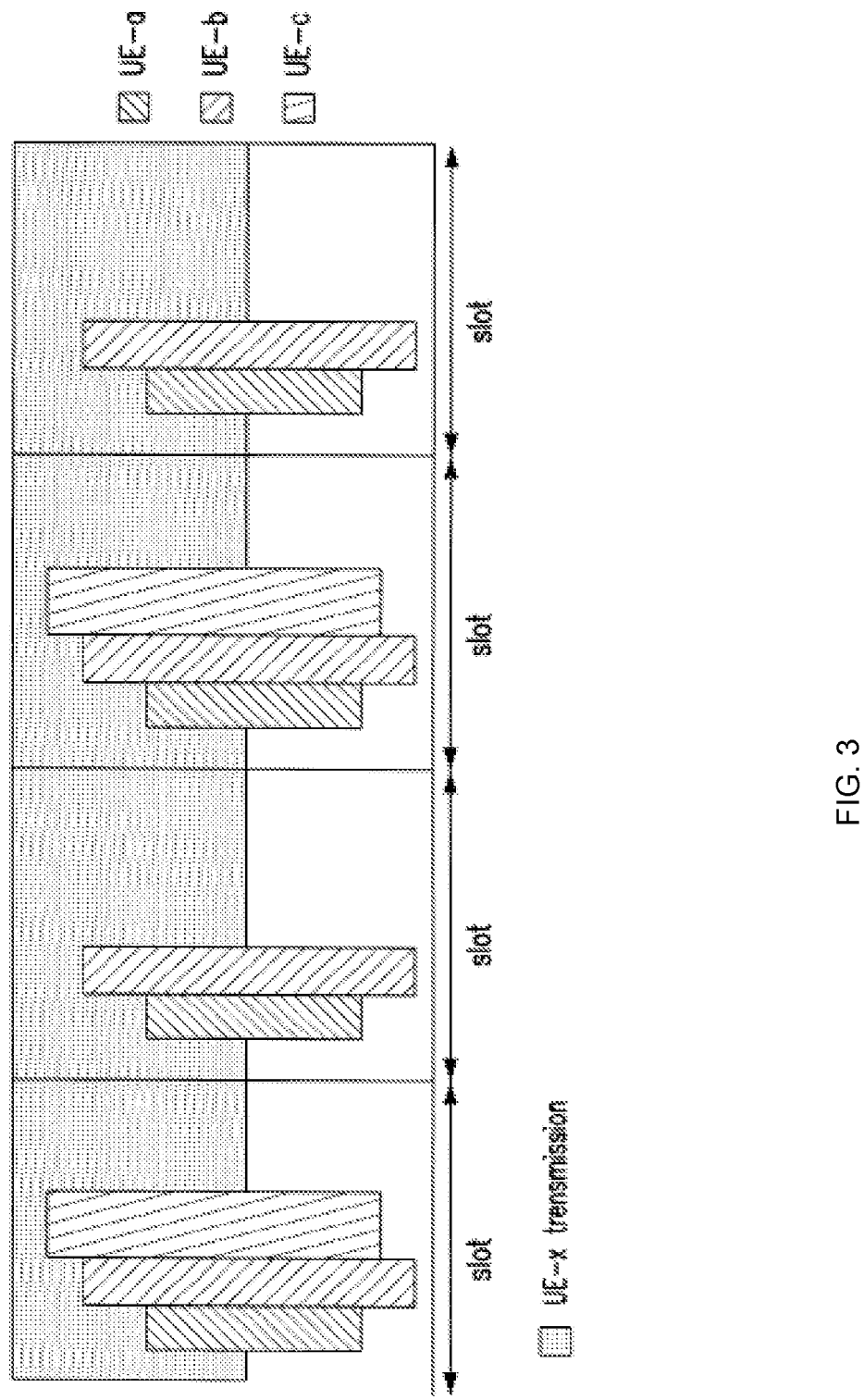
FIG. 3 shows that eMBB traffic of a particular UE avoids the reserved resources according to the predictable UL GF configurations.
Figure 4:
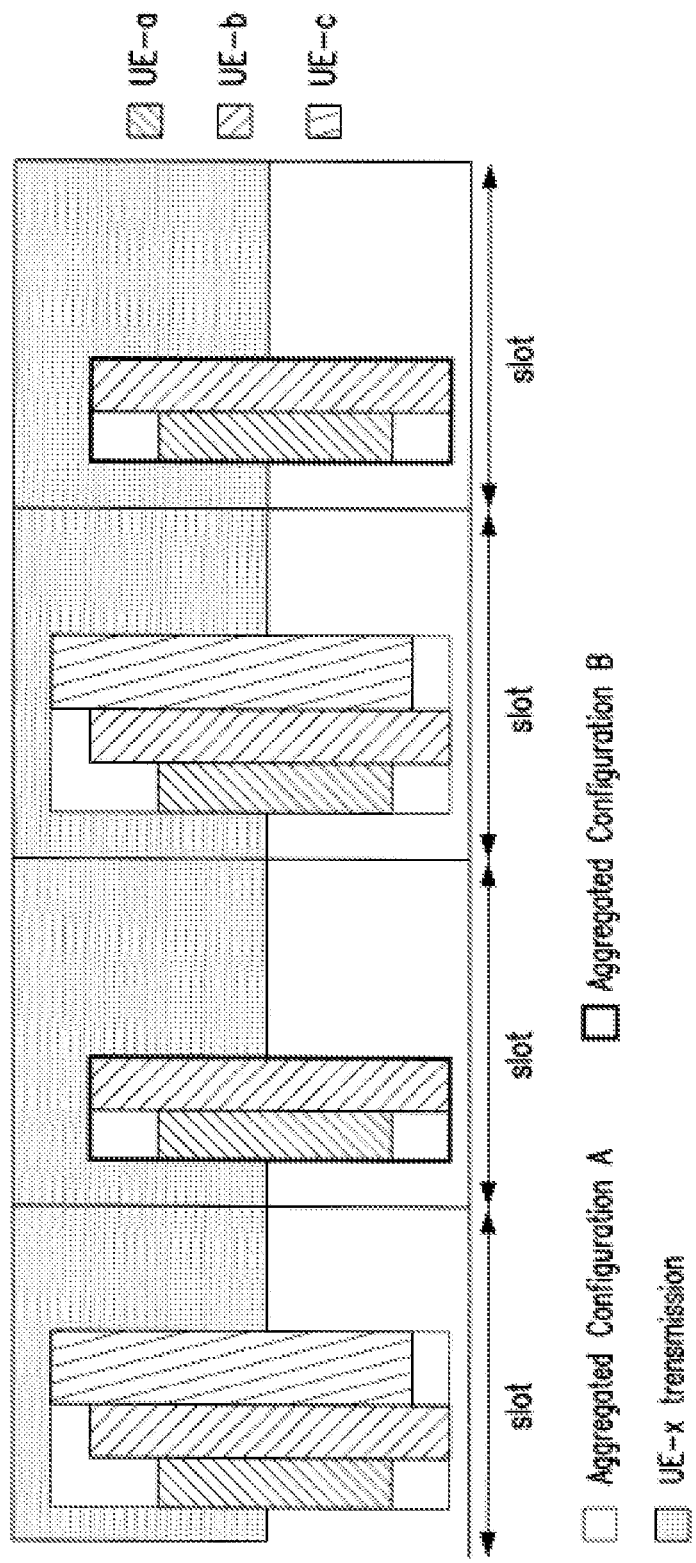
FIG. 4 shows that eMBB traffic of a particular UE avoids the reserved resources according to the predictable UL GF configurations.

In one example, the eMBB UE may be scheduled with UL transmission during a slot or mini-slot that is part of the reserved resources. Accordingly, the eMBB UE maps its UL signals/channels around such reserved resources. Examples of the eMBB UE mapping its UL signals/channels around reserved resources are illustrated in FIG. 3 and FIG. 4, where UE-x is an eMBB UE. FIG. 3 shows that eMBB traffic of UE-x avoids the reserved resources according to the predictable UL GF configurations of UE-a, UE-b, and UE-c. FIG. 2 shows that eMBB traffic of UE-x avoids the reserved resources according to the Aggregated Configuration A and B, as shown and described with reference to FIG. 2 and table 6.

Figure 5:
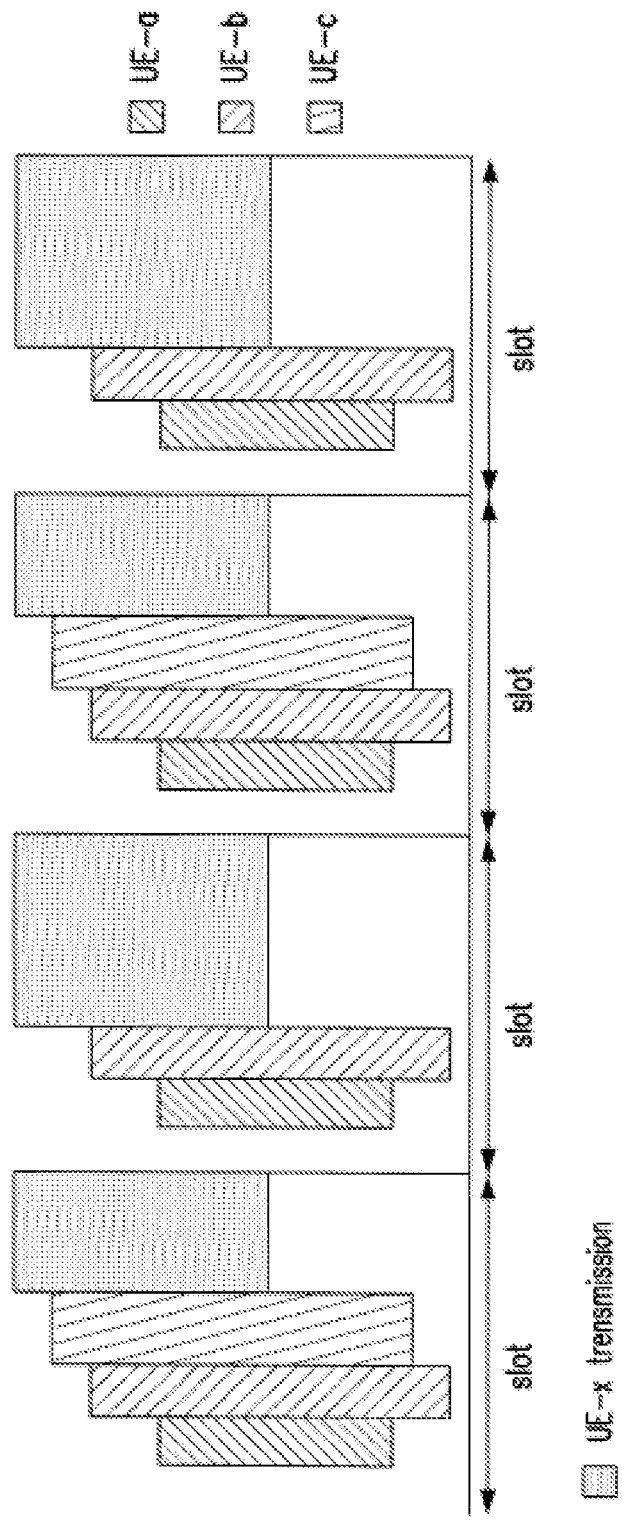
FIG. 5 illustrates an example where a UE refrains from sending any UL transmission on reserved resources.
Figure 6:
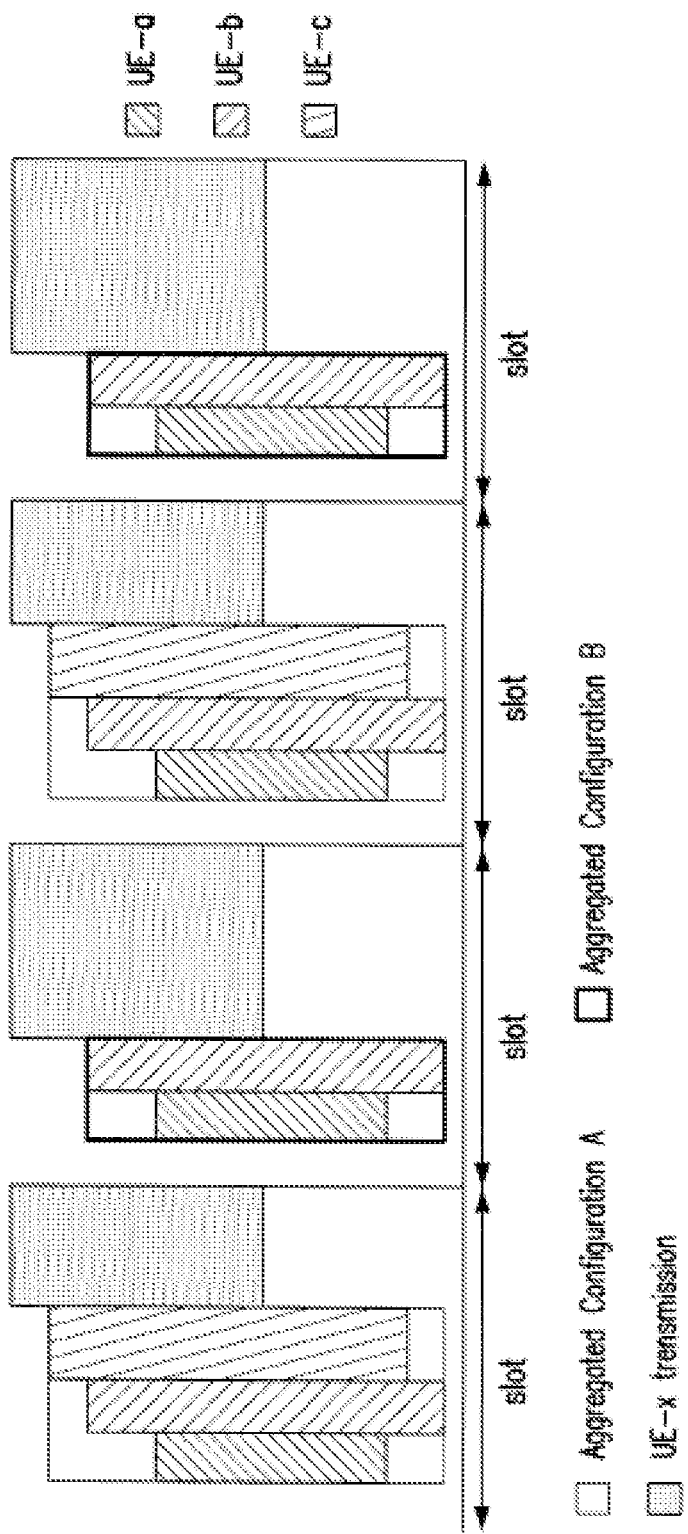
FIG. 6 illustrates an example where a UE refrains from sending any UL transmission on reserved resources.

As another example, the eMBB UE may refrain from sending any UL configured grant transmission during the mini-slot(s) or OFDM symbols that are part of the reserved resources. Examples of the eMBB UE refraining from sending any UL transmission on the reserved resources are illustrated in FIG. 5 and FIG. 6, where UE-x is an eMBB UE. FIG. 5 shows that eMBB traffic of UE-x avoids the OFDM symbols in the reserved resources according to the predictable UL GF configurations of UE-a, UE-b, and UE-c. FIG. 6 shows that eMBB traffic of UE-x avoids OFDM symbols in the reserved resources according to the Aggregated Configuration A and B, as shown and described with reference to FIG. 2 and table 6.

Identification of Own Configuration

In some embodiments, a UE, e.g., a URLLC UE, is signaled aggregated information including configured grant configurations which contain its own allocated reserved resources. In such embodiments, the UE identifies the allocated reserved resources overlapping the reserved resources indicated by the received configured grant configurations. The UE may transmit on the identified overlapping resources, but avoids transmissions on the reserved resources indicated by the received configured grant configurations where there is no overlap.

In some embodiments, the UE removes its own allocated reserved resources from the signaled set of resources indicated by the received configured grant configurations before determining which resources to avoid transmitting on.

Figure 7:
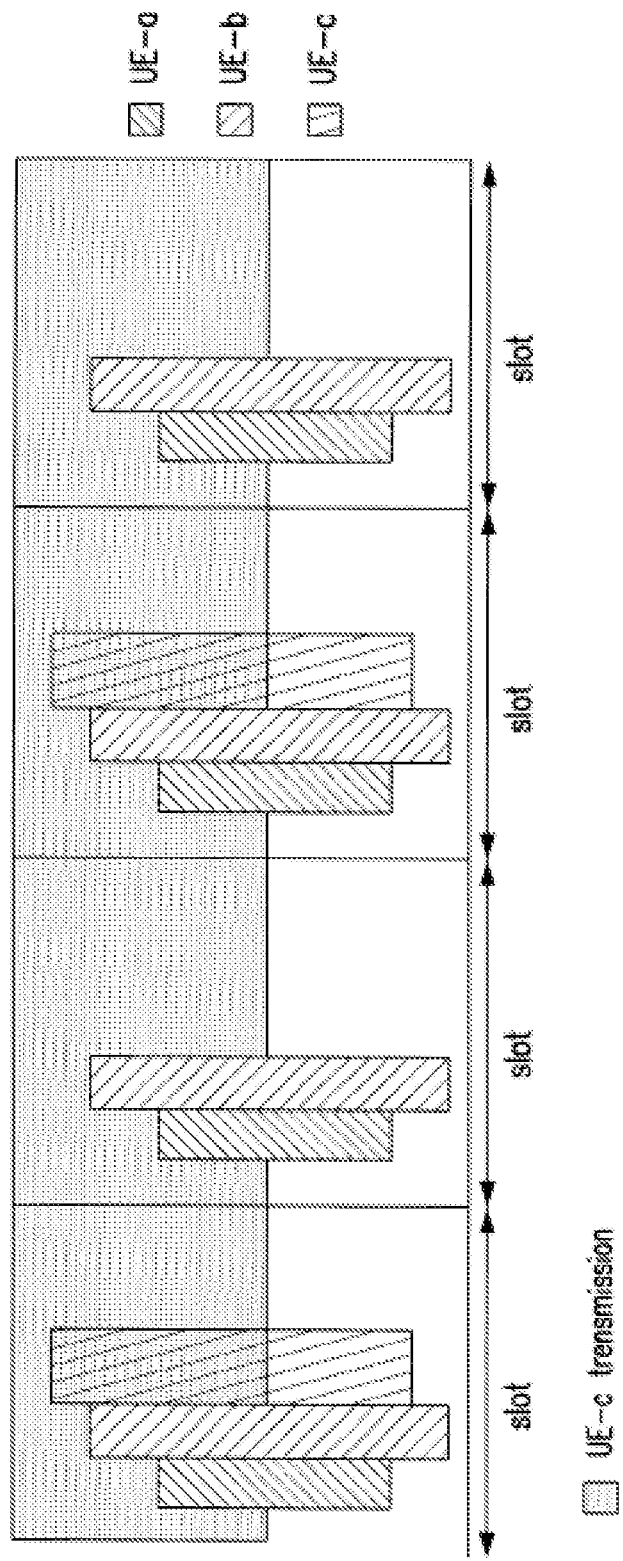
FIG. 7 illustrates an example where a UE identifies its own predictable resources from the signalled set of predictable UL GF configuration.
Figure 8:
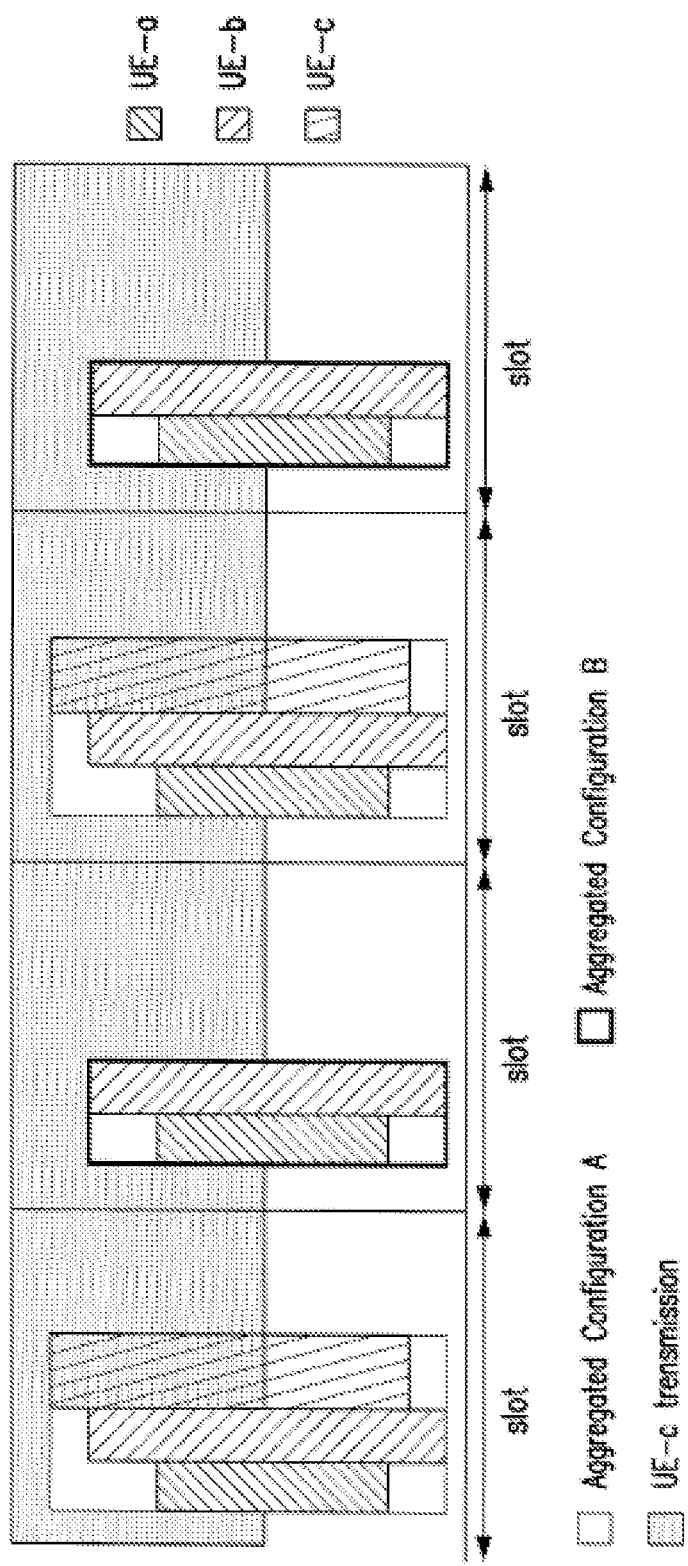
FIG. 8 illustrates an example where a UE identifies its own predictable resources from the signalled set of predictable UL GF configuration.

Examples are illustrated in FIG. 7 and FIG. 8, where UE-c identifies its own predictable resources from the signaled set of predictable UL GF configuration. FIG. 7 shows that UE-c avoids reserved resources for UE-a and UE-b, but the UE-c still uses its own allocated reserved resources for UL transmission. FIG. 8 shows that UE-c avoids reserved resources for UE-a and UE-b according to the Aggregated Configuration A and B, as shown and described with reference to FIG. 2 and table 6, but the UE-c still uses its own allocated reserved resources for UL transmission.

Transport Block Size Determination for Altered Transmissions

In some embodiments, a UE, e.g. eMBB UE, removes the number of resource elements it avoids transmitting on from the number of resource elements $N_{RE}$ allocated for PUSCH that is used to determine the transport block size. In some embodiments $N_{RE}$ is determined as follows:

$N_{RE} = \min(156, N'_{RE}) * n_{PRB} - N_{RE,reserved}$, where $N_{RE,reserved}$ is equal to the number of REs that the UE avoids transmitting on, or an approximation of the number of REs that the UE avoids transmitting on.

Figure 9:
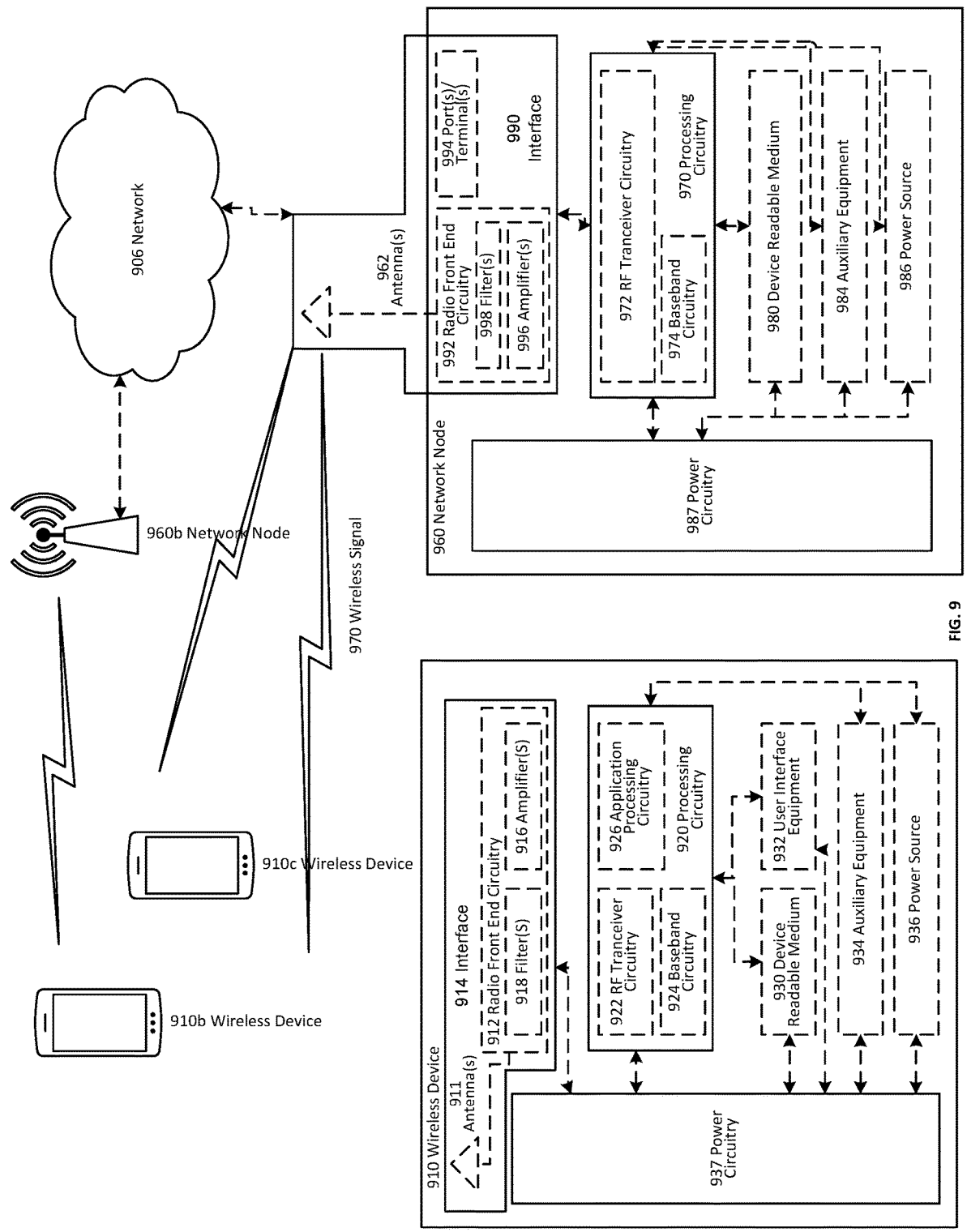
FIG. 9 illustrates an example network.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960*b*, and WDs 910, 910*b*, and 910*c*. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
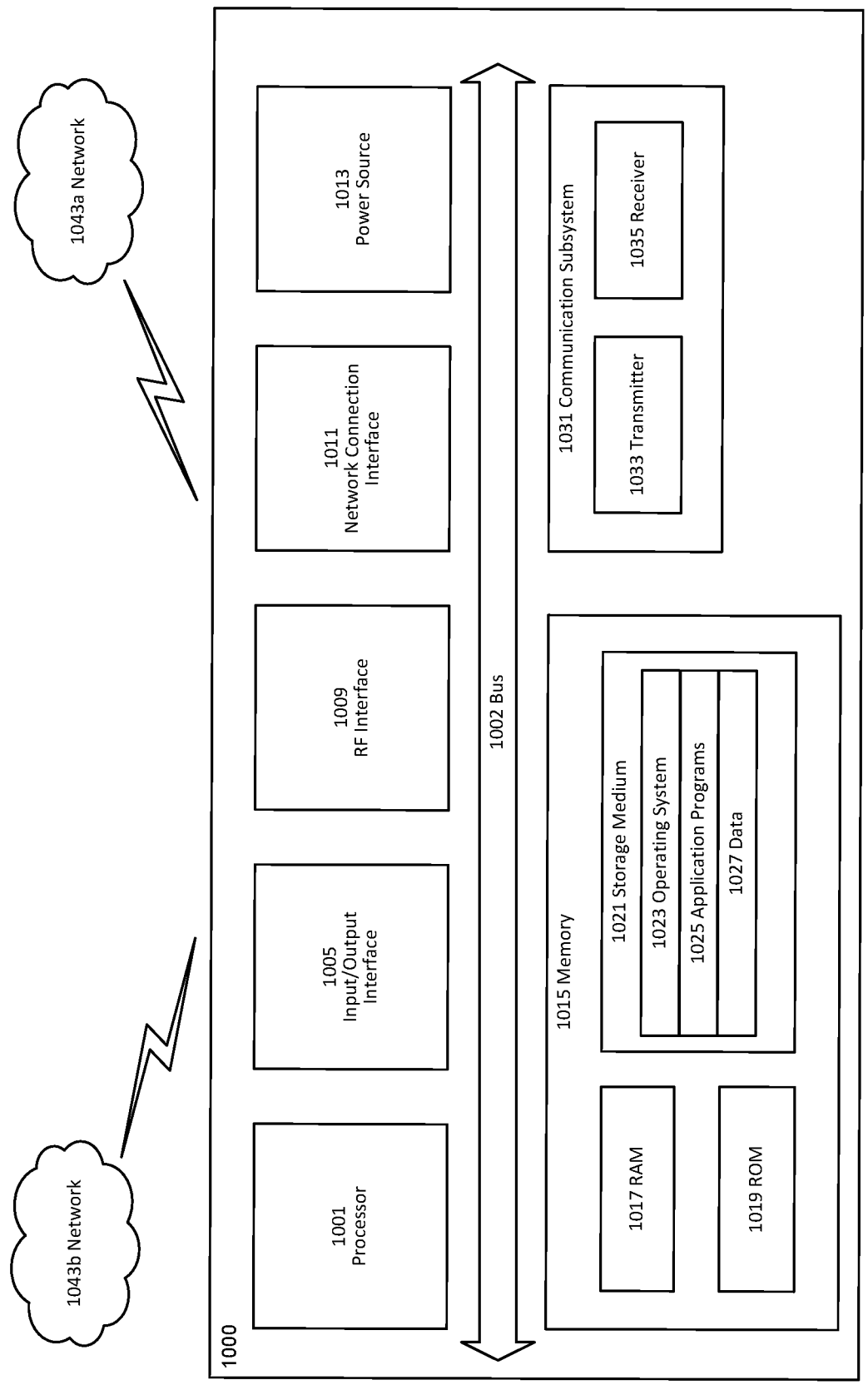
FIG. 10 illustrates a UE according to an embodiment.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 10200 may be any UE identified by the 3rd Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the 3rd Generation Partnership Project (3GPP), such as 3GPP's GSM, UNITS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043b. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043b may encompass wired and/or wireless networks such as a local-area network (LAN), a wide-area network (WAN), a computer network, a wireless network, a telecommunications network, another like network or any combination thereof. For example, network 1043b may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
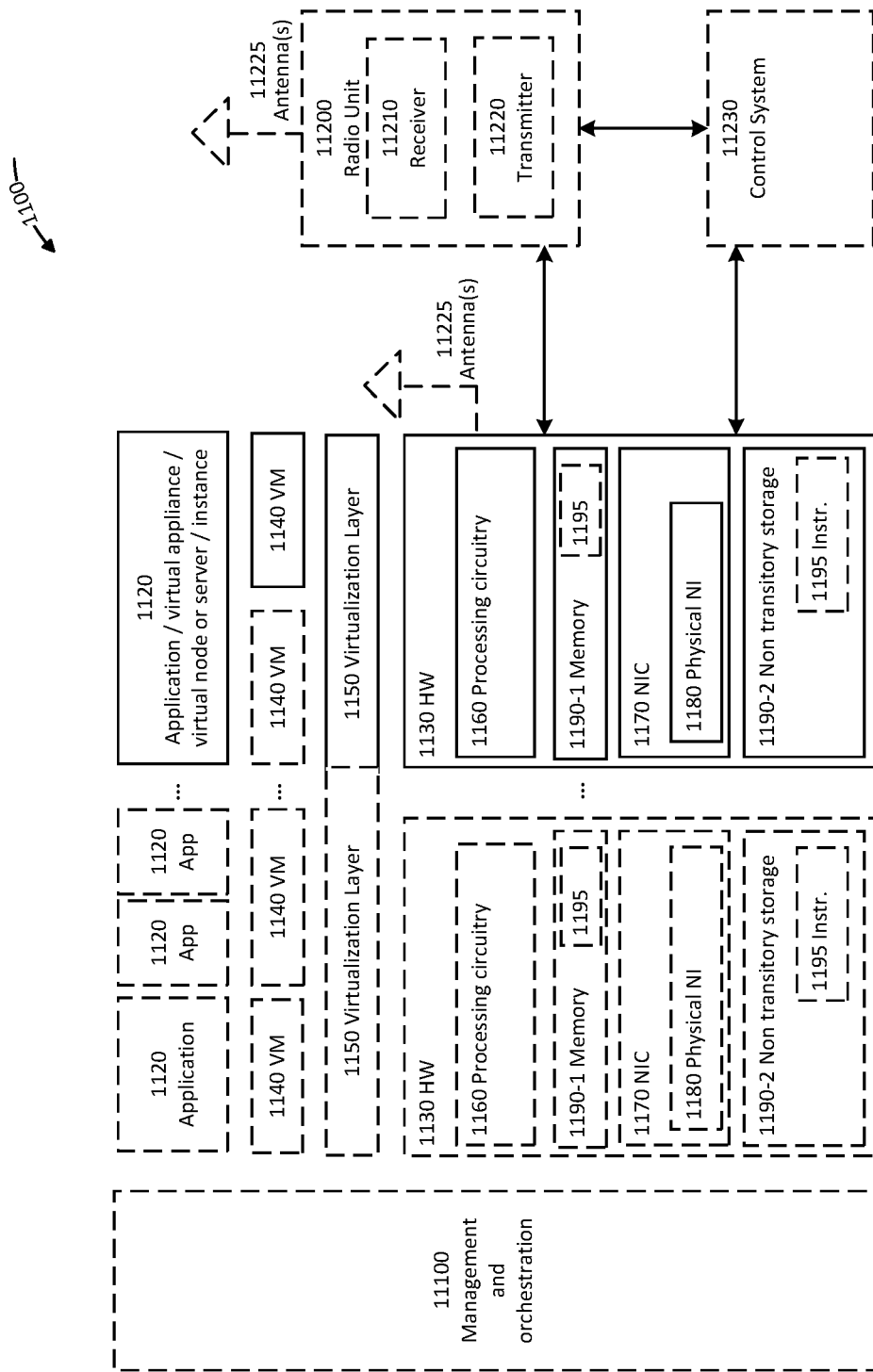
FIG. 11 is a schematic block diagram illustrating a virtualization environment.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Figure 12:
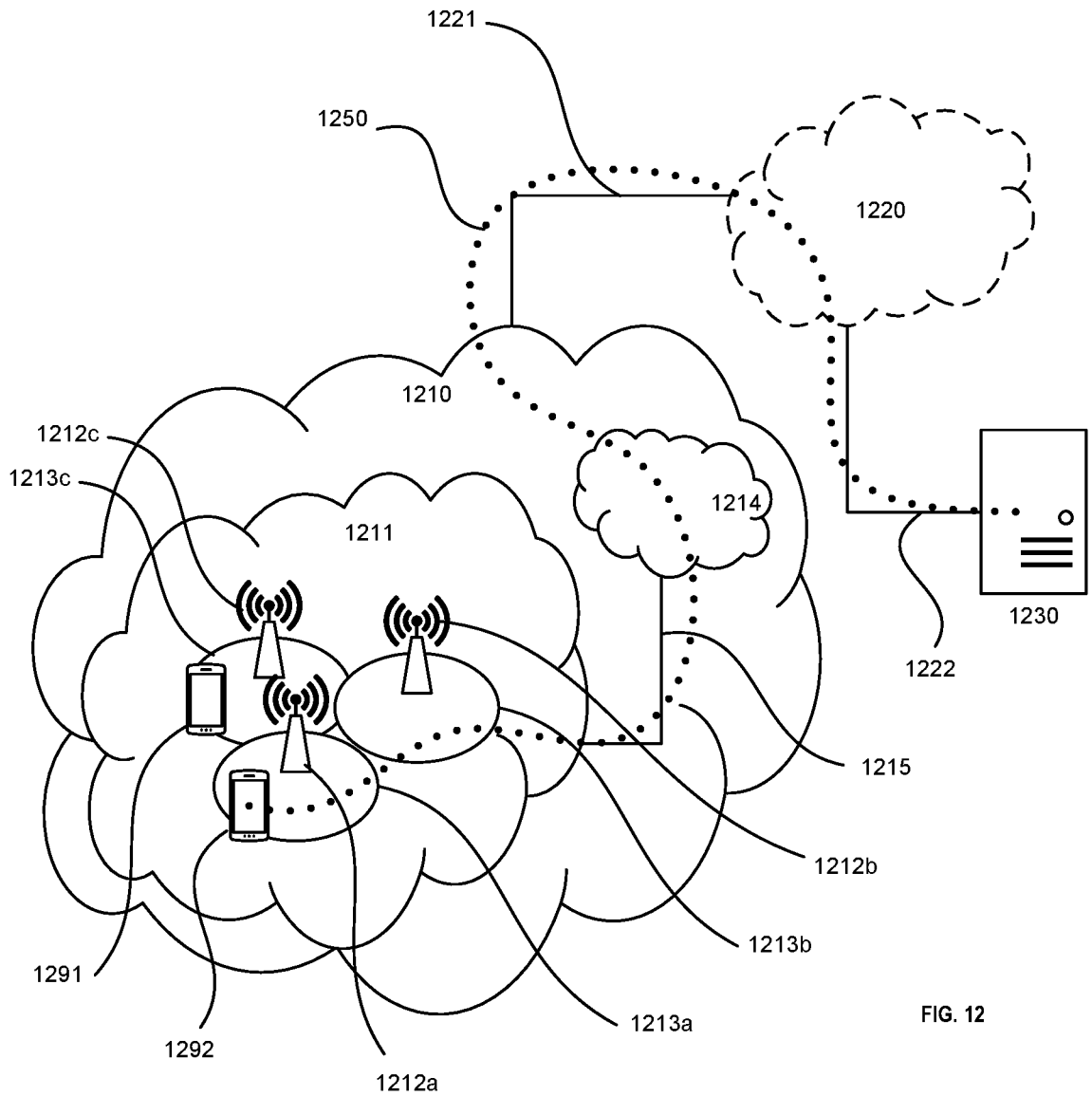
FIG. 12 illustrates a communication system.

With reference to FIG. 12, a communication system in accordance with an embodiment is shown. The illustrated communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

Figure 13:
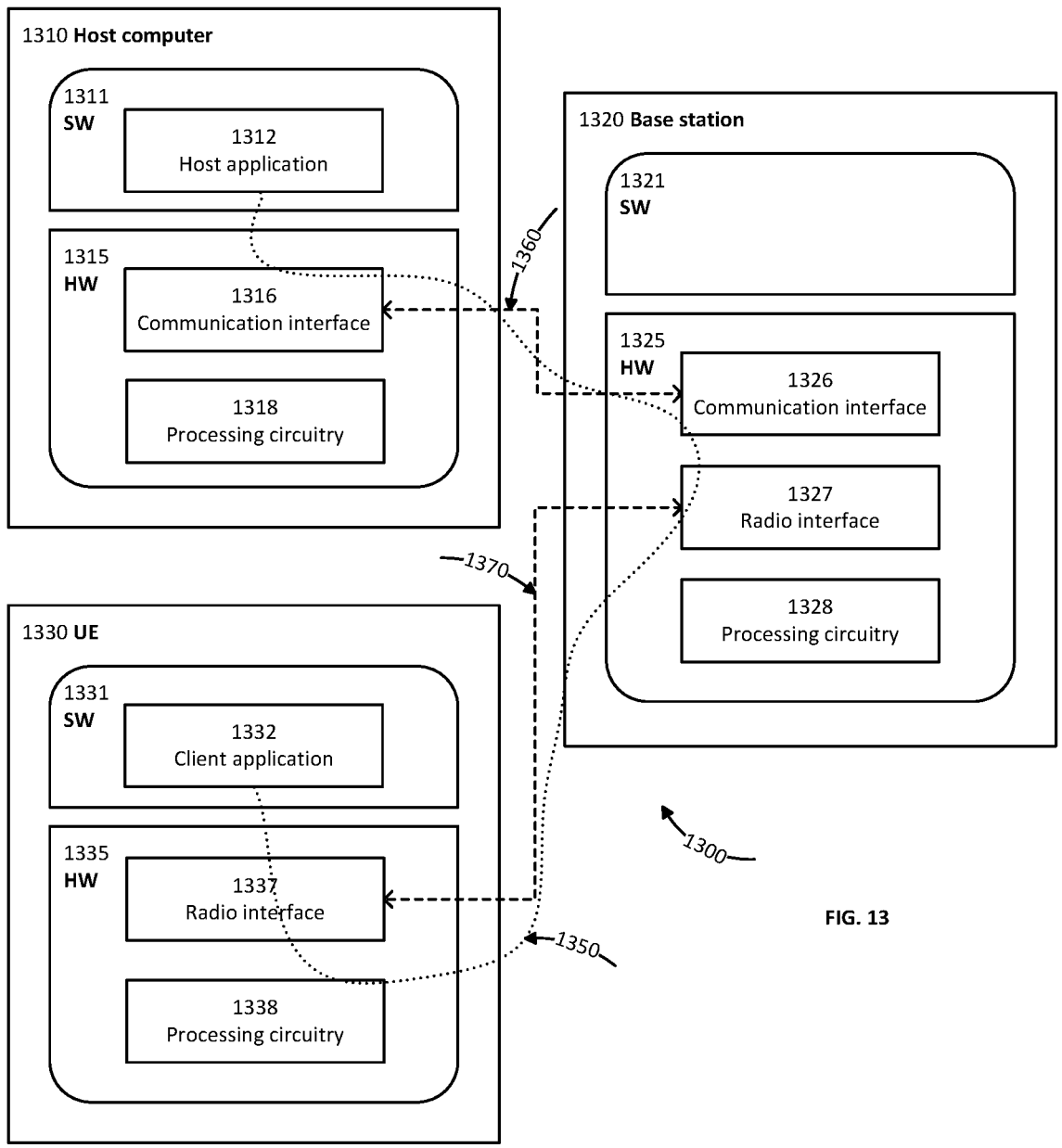
FIG. 13 illustrates an example implementation of a UE and a base station.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may efficient multiplexing of UL URLLC traffic and eMBB traffic.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
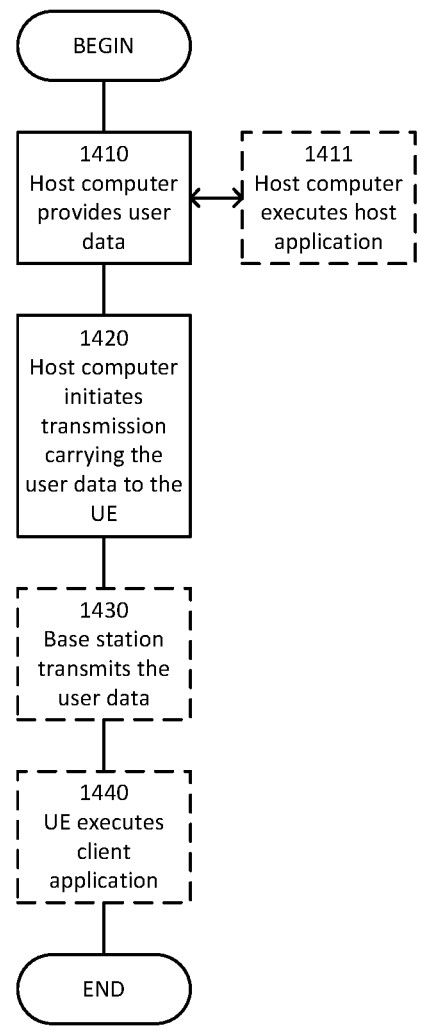
FIGS. 14-20 are flowcharts illustrating different processes according to various embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
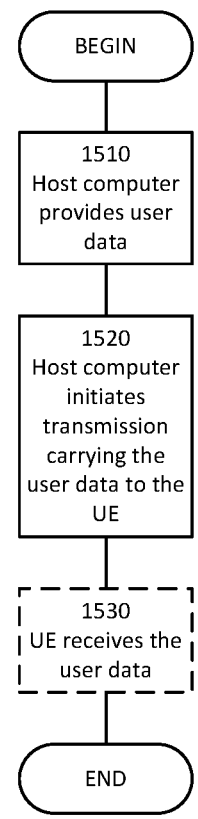

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
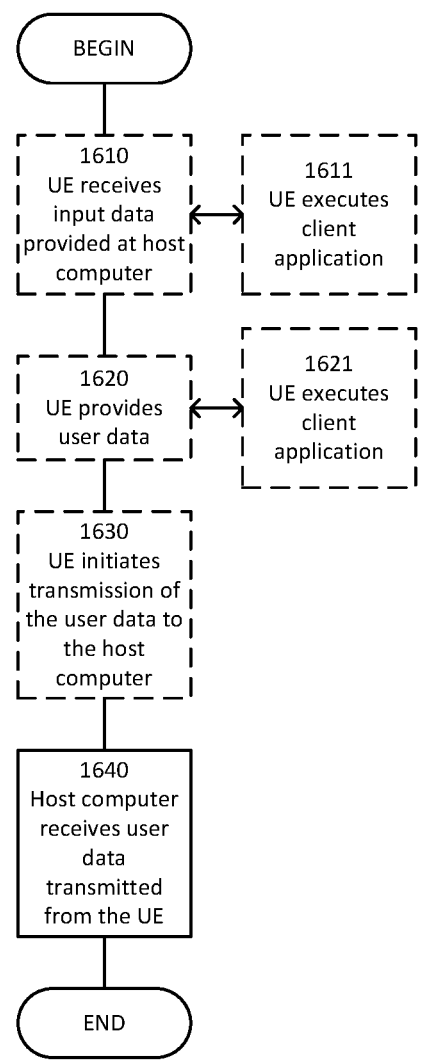

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
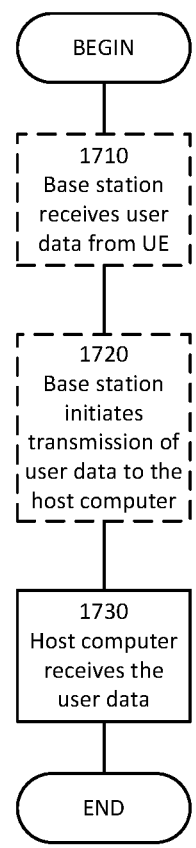

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 18:
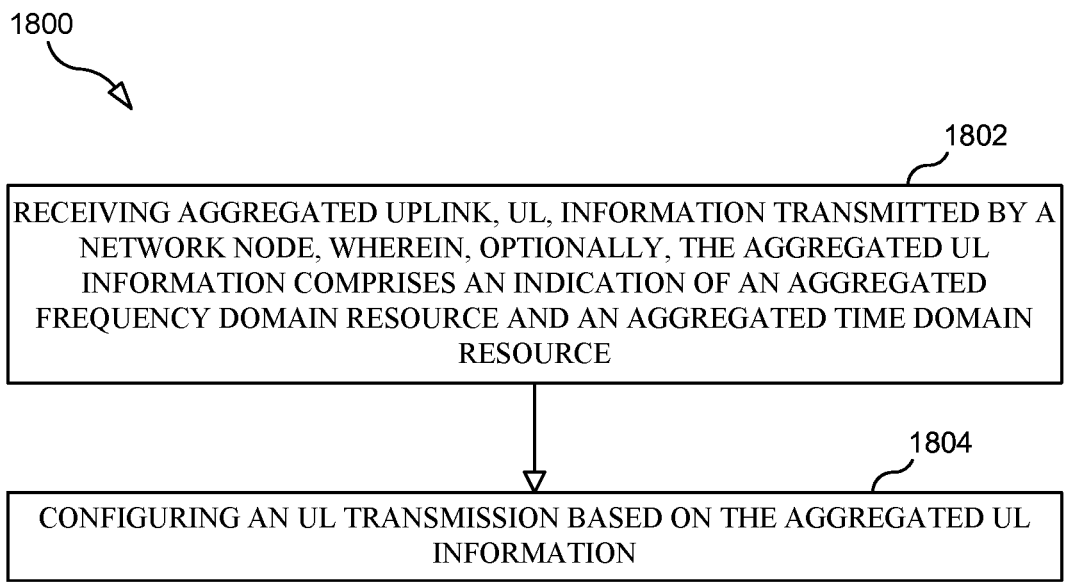

FIG. 18 is a flow chart illustrating a process 1800 performed by a wireless device according to some embodiments. Process 1800 may begin with step s1802 in which the wireless device receives aggregated uplink, UL, information transmitted by a network node, wherein, optionally, the aggregated UL information comprises an indication of an aggregated frequency domain resource and an aggregated time domain resource. In step s1804, the wireless device configures an UL transmission based on the aggregated UL information.

In some embodiments, the step of configuring an UL transmission based on the aggregated UL information comprises utilizing, for the UL transmission, frequency and time domain resources other than the aggregated frequency domain resource and the aggregated time domain resource.

In some embodiments, the step of configuring an UL transmission based on the aggregated UL information comprises identifying portions of the UL transmission scheduled to utilize frequency and time domain resources overlapping the aggregated frequency and time domain resource; and removing the identified portions of the UL transmission.

In some embodiments, the step of configuring an UL transmission based on the aggregated UL information comprises identifying a portion of the aggregated frequency and time domain resource allocated to the UE; and utilizing, for the UL transmission, (1) the identified portion of the aggregated frequency and time domain resource and/or (2) frequency and time domain resources other than the aggregated frequency and time domain resource.

In some embodiments, the aggregated UL information comprises a list of UL configurations for two or more UEs. In some embodiments, the aggregated UL information comprises sorted, according to predetermined criteria, UL configurations for two or more UEs. In some embodiments, each of the two or more UEs is capable of URLLC transmission. In some embodiments, the aggregated frequency and time domain resource are reserved for URLLC transmission.

Figure 19:
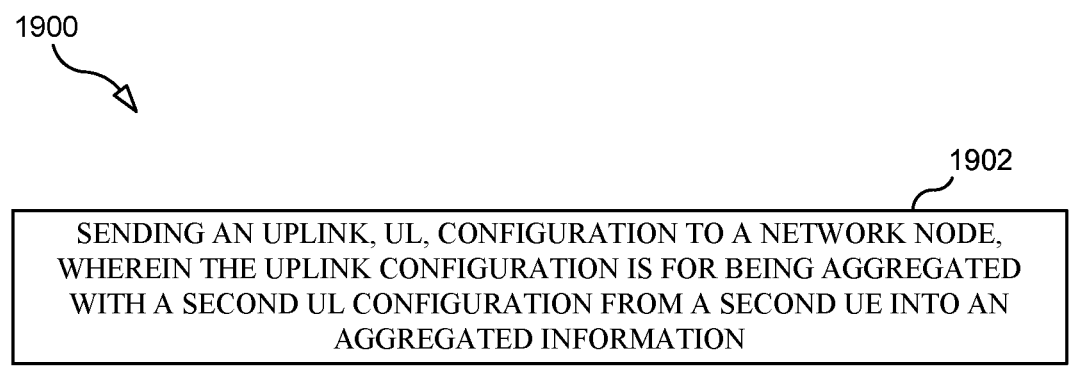

FIG. 19 is a flow chart illustrating a process 1900 performed by a wireless device according to some embodiments. Process 1900 may begin with step s1902 in which the wireless device sends an uplink, UL, configuration to a network node, wherein the uplink configuration is for being aggregated with a second UL configuration from a second UE into an aggregated information.

Figure 20:
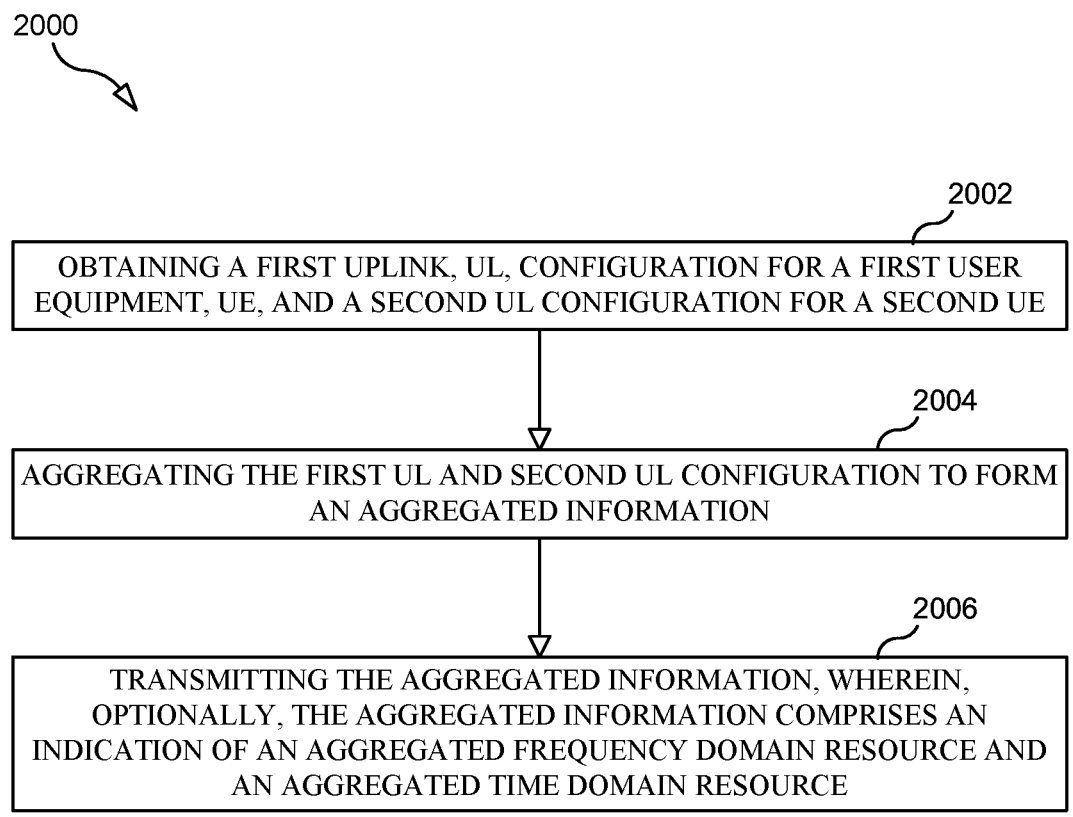

FIG. 20 is a flow chart illustrating a process 2000 performed by a network node according to some embodiments. Process 2000 may begin with step s2002 in which the network node obtains a first uplink, UL, configuration for a first user equipment, UE, and a second UL configuration for a second UE. In step s2004, the network node aggregates the first UL and second UL configuration to form an aggregated information. In step s2006, the network node transmits the aggregated information, wherein, optionally, the aggregated information comprises an indication of an aggregated frequency domain resource and an aggregated time domain resource.

In some embodiments, the step of aggregating the first UL and second UL configuration comprises listing the first UL configuration and the second UL configuration. In some embodiments, each of the first and second UL configuration comprises one or more parameters that, optionally, may include one or more of a periodicity, a number of configured repetitions, a time domain resource allocation, and a frequency domain resource allocation.

In some embodiments, the step of aggregating the first UL and second UL configuration comprises sorting, according to predetermined criteria, the first UL configuration and the second UL configuration, thereby forming one or more aggregated UL configurations. In some embodiments, the one or more aggregated UL configurations comprise one or more parameters that, optionally, may include one or more of a periodicity, a number of configured repetitions, a time domain resource allocation, and a frequency domain resource allocation.

In some embodiments, the step of transmitting the aggregated information comprises broadcasting the aggregated information to a cell provided by the network node, multicasting the aggregated information to a group of UEs, and/or transmitting the aggregated information to an individual UE.

In some embodiments, the aggregated frequency and time domain resource are reserved for ultra-reliable low latency communication (URLLC) transmission. In some embodiments, each of the first and second UE is capable of URLLC transmission.

Figure 21:
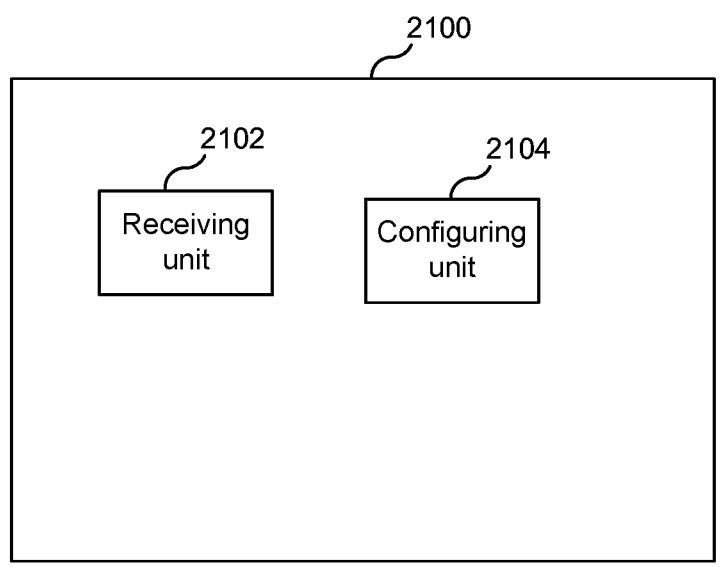
FIG. 21 illustrates a schematic block diagram of an apparatus.

FIG. 21 illustrates a schematic block diagram of an apparatus 2100 in a wireless network (for example, the wireless network shown in FIG. 9). The apparatus may be implemented in a wireless device or network node (e.g., wireless device 910 or network node 960 shown in FIG. 9). Apparatus 2100 is operable to carry out the example method described with reference to FIG. 18 and possibly any other processes or methods disclosed herein. It is also to be understood that the method of FIG. 18 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 2102 and configuring unit 2104, and any other suitable units of apparatus 2100 to perform corresponding functions according one or more embodiments of the present disclosure.

As illustrated in FIG. 21, apparatus 2100 includes a receiving unit 2102 configured to receive aggregated uplink, UL, information transmitted by a network node, wherein, optionally, the aggregated UL information comprises an indication of an aggregated frequency domain resource and an aggregated time domain resource, and a configuring unit 2104 configured to configure an UL transmission based on the aggregated UL information.

Figure 22:
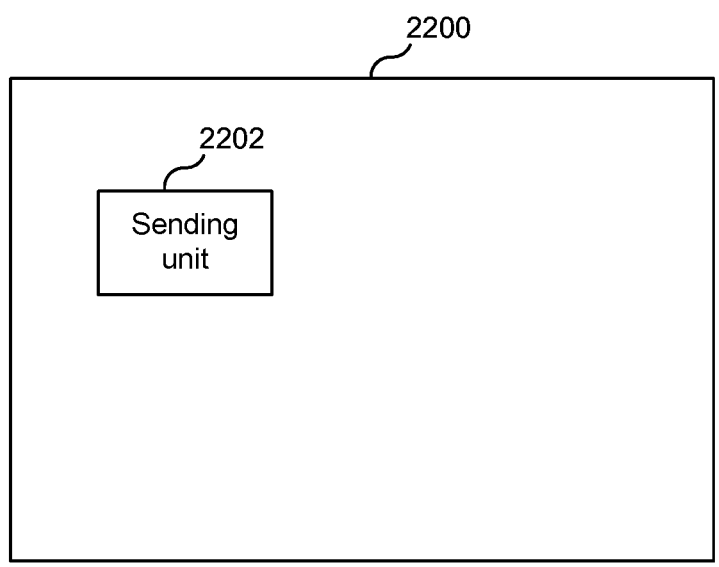
FIG. 22 illustrates a schematic block diagram of an apparatus.

FIG. 22 illustrates a schematic block diagram of an apparatus 2200 in a wireless network (for example, the wireless network shown in FIG. 9). The apparatus may be implemented in a wireless device or network node (e.g., wireless device 910 or network node 960 shown in FIG. 9). Apparatus 2200 is operable to carry out the example method described with reference to FIG. 19 and possibly any other processes or methods disclosed herein. It is also to be understood that the method of FIG. 19 is not necessarily carried out solely by apparatus 2200. At least some operations of the method can be performed by one or more other entities.

Virtual Apparatus 2200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause sending unit 2202, and any other suitable units of apparatus 2200 to perform corresponding functions according one or more embodiments of the present disclosure.

As illustrated in FIG. 22, apparatus 2200 includes a sending unit 2202 configured to send an uplink, UL, configuration to a network node, wherein the uplink configuration is for being aggregated with a second UL configuration from a second UE into an aggregated information.

Figure 23:
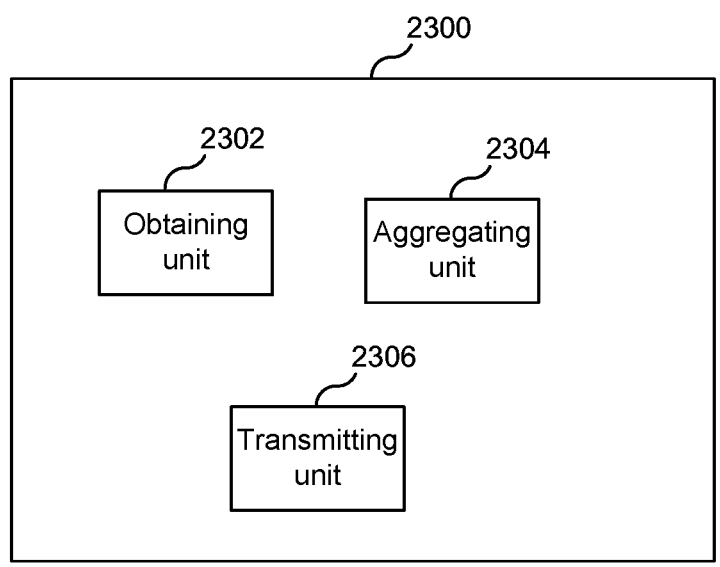
FIG. 23 illustrates a schematic block diagram of an apparatus.

FIG. 23 illustrates a schematic block diagram of an apparatus 2300 in a wireless network (for example, the wireless network shown in FIG. 9). The apparatus may be implemented in a wireless device or network node (e.g., wireless device 910 or network node 960 shown in FIG. 9). Apparatus 2300 is operable to carry out the example method described with reference to FIG. 20 and possibly any other processes or methods disclosed herein. It is also to be understood that the method of FIG. 20 is not necessarily carried out solely by apparatus 2300. At least some operations of the method can be performed by one or more other entities.

Virtual Apparatus 2300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause sending unit 2302, aggregating unit 2306, and any other suitable units of apparatus 2300 to perform corresponding functions according one or more embodiments of the present disclosure.

As illustrated in FIG. 23, apparatus 2300 includes an obtaining unit 2302 configured to obtain a first uplink, UL, configuration for a first user equipment, UE, and a second UL configuration for a second UE, an aggregating unit 2304 configured to aggregate the first UL and second UL configuration to form an aggregated information, and a transmitting unit 2306 to transmit the aggregated information, wherein, optionally, the aggregated information comprises an indication of an aggregated frequency domain resource and an aggregated time domain resource.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Concise Description of Some of the Embodiments

Group A Embodiments—Wireless Device

A1. A method performed by a wireless device, the method comprising: receiving aggregated uplink, UL, information transmitted by a network node, wherein, optionally, the aggregated UL information comprises an indication of an aggregated frequency domain resource and an aggregated time domain resource; and configuring an UL transmission based on the aggregated UL information.

A2. The method of A1, wherein configuring an UL transmission based on the aggregated UL information comprises: utilizing, for the UL transmission, frequency and time domain resources other than the aggregated frequency domain resource and the aggregated time domain resource.

A3. The method of A1 or A2, wherein configuring an UL transmission based on the aggregated UL information comprises: identifying portions of the UL transmission scheduled to utilize frequency and time domain resources overlapping the aggregated frequency and time domain resource; and removing the identified portions of the UL transmission.

A4. The method of A1, wherein configuring an UL transmission based on the aggregated UL information comprises: identifying a portion of the aggregated frequency and time domain resource allocated to the UE; and utilizing, for the UL transmission, (1) the identified portion of the aggregated frequency and time domain resource and/or (2) frequency and time domain resources other than the aggregated frequency and time domain resource.

A5. The method of any one of A1-A4, wherein the aggregated UL information comprises a list of UL configurations for two or more UEs.

A6. The method of any one of A1-A5, wherein the aggregated UL information comprises sorted, according to predetermined criteria, UL configurations for two or more UEs.

A7. The method of A5 of A6, wherein each of the two or more UEs is capable of URLLC transmission.

A8. The method of A1-A7, wherein the aggregated frequency and time domain resource are reserved for URLLC transmission.

A9. A method performed by a wireless device, the method comprising at least one of: sending an uplink, UL, configuration to a network node, wherein the uplink configuration is for being aggregated with a second UL configuration from a second UE into an aggregated information.

A10. The method of any of the previous embodiments, further comprising: providing user data; and forwarding the user data to a host computer via the transmission to the base station.

Group B Embodiments—Base Station B1. A method performed by a base station, the method comprising at least one of: obtaining a first uplink, UL, configuration for a first user equipment, UE, and a second UL configuration for a second UE; aggregating the first UL and second UL configuration to form an aggregated information; and transmitting the aggregated information, wherein, optionally, the aggregated information comprises an indication of an aggregated frequency domain resource and an aggregated time domain resource.

B2. The method of B1, wherein aggregating the first UL and second UL configuration comprises: listing the first UL configuration and the second UL configuration.

B3. The method of B1 or B2, wherein each of the first and second UL configuration comprises one or more parameters that, optionally, may include one or more of a periodicity, a number of configured repetitions, a time domain resource allocation, and a frequency domain resource allocation.

B4. The method of B1, wherein aggregating the first UL and second UL configuration comprises: sorting, according to predetermined criteria, the first UL configuration and the second UL configuration, thereby forming one or more aggregated UL configurations.

B5. The method of B4, wherein the one or more aggregated UL configurations comprise one or more parameters that, optionally, may include one or more of a periodicity, a number of configured repetitions, a time domain resource allocation, and a frequency domain resource allocation.

B6. The method of any one of B1-B5, wherein transmitting the aggregated information comprises: broadcasting the aggregated information to a cell provided by the network node, multicasting the aggregated information to a group of UEs, and/or transmitting the aggregated information to an individual UE.

B7. The method of any one of B1-B6, wherein the aggregated frequency and time domain resource are reserved for ultra-reliable low latency communication (URLLC) transmission.

B8. The method of any one of B1-B7, wherein each of the first and second UE is capable of URLLC transmission.

B9. The method of any of the previous embodiments, further comprising: obtaining user data; and forwarding the user data to a host computer or a wireless device.

Group C Embodiments C1. A wireless device comprising: processing circuitry configured to perform any of the steps of any of the Group A embodiments; and power supply circuitry configured to supply power to the wireless device.

C2. A network node comprising: processing circuitry configured to perform any of the steps of any of the Group B embodiments; power supply circuitry configured to supply power to the wireless device.

C3. A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

C4. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

C5. The communication system of the pervious embodiment further including the base station.

C6. The communication system of the previous 2 embodiments, further including the UE, wherein the UE is configured to communicate with the base station.

C7. The communication system of the previous 3 embodiments, wherein: the processing circuitry of the host computer is configured to execute a host application, thereby providing the user data; and the UE comprises processing circuitry configured to execute a client application associated with the host application.

C8. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

C9. The method of the previous embodiment, further comprising, at the base station, transmitting the user data.

C10. The method of the previous 2 embodiments, wherein the user data is provided at the host computer by executing a host application, the method further comprising, at the UE, executing a client application associated with the host application.

C11. A user equipment (UE) configured to communicate with a base station, the UE comprising a radio interface and processing circuitry configured to performs the of the previous 3 embodiments.

C12. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

C13. The communication system of the previous embodiment, wherein the cellular network further includes a base station configured to communicate with the UE.

C14. The communication system of the previous 2 embodiments, wherein: the processing circuitry of the host computer is configured to execute a host application, thereby providing the user data; and the UE's processing circuitry is configured to execute a client application associated with the host application.

C15. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

C16. The method of the previous embodiment, further comprising at the UE, receiving the user data from the base station.

C17. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A embodiments.

C18. The communication system of the previous embodiment, further including the UE.

C19. The communication system of the previous 2 embodiments, further including the base station, wherein the base station comprises a radio interface configured to communicate with the UE and a communication interface configured to forward to the host computer the user data carried by a transmission from the UE to the base station.

C20. The communication system of the previous 3 embodiments, wherein: the processing circuitry of the host computer is configured to execute a host application; and the UE's processing circuitry is configured to execute a client application associated with the host application, thereby providing the user data.

C21. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

C22. A method implemented in a communication system including a host computer, a base station and a user equipment (UE), the method comprising: at the host computer, receiving user data transmitted to the base station from the UE, wherein the UE performs any of the steps of any of the Group A embodiments.

C23. The method of the previous embodiment, further comprising, at the UE, providing the user data to the base station.

C24. The method of the previous 2 embodiments, further comprising: at the UE, executing a client application, thereby providing the user data to be transmitted; and at the host computer, executing a host application associated with the client application.

C25. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

C26. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

C27. The communication system of the previous embodiment further including the base station.

C28. The communication system of the previous 2 embodiments, further including the UE, wherein the UE is configured to communicate with the base station.

C29. The communication system of the previous 3 embodiments, wherein: the processing circuitry of the host computer is configured to execute a host application; the UE is configured to execute a client application associated with the host application, thereby providing the user data to be received by the host computer.

C30. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A embodiments.

C31. The method of the previous embodiment, further comprising at the base station, receiving the user data from the UE.

C32. The method of the previous 2 embodiments, further comprising at the base station, initiating a transmission of the received user data to the host computer.

While various embodiments of the present disclosure are described herein, it should be understood that they have been presented by way of example only, and not limitation. Thus, the breadth and scope of the present disclosure should not be limited by any of the above described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a first wireless device, the method comprising:
    the first wireless device receiving, from a network node, a Radio Resource Control (RRC) message addressed to the first wireless device, the RRC message addressed to the first wireless device comprising aggregated uplink information comprising information specifying a first set of reserved uplink (UL) resources that are not available for use by the first wireless device; and
    configuring an uplink transmission based on the aggregated uplink information.

2. The method of claim 1, wherein configuring the uplink transmission based on the aggregated uplink information comprises utilizing, for the uplink transmission, a second set of uplink resources wherein the second set of uplink resources does not include any reserved UL resource included in the first set of reserved UL resources.

3. The method of claim 1, wherein configuring the uplink transmission based on the aggregated uplink information comprises:
    identifying a portion of the uplink transmission that is scheduled to utilize a reserved resource included in the first set of reserved UL resources; and
    removing the identified portion of the uplink transmission.

4. The method of claim 1, wherein
    the aggregated uplink information further comprises information indicating a second set of reserved uplink (UL) resources, wherein the second set of reserved UL resources are available for use by the first wireless device, and
    the method further comprises performing the uplink transmission using at least one of the reserved UL resources included in the second set of reserved UL resources.

5. The method of claim 1, wherein the aggregated uplink information further comprises information indicating: a periodicity, a number of configured repetitions, a time domain resource allocation, and/or a frequency resource allocation.

6. A method performed by a network node, the method comprising:
- obtaining a first uplink (UL) grant free (GF) configuration for a first user equipment (UE), wherein the first UL GF configuration indicates UL resources reserved for the first UE;
- obtaining a second uplink (UL) grant free (GF) configuration for a second user equipment (UE), wherein the second UL GF configuration indicates UL resources reserved for the second UE;
- aggregating the first and second UL GF configurations to form aggregated UL information, wherein the aggregated UL information indicates an aggregated set of reserved UL resources, and the aggregated set of reserved UL resources includes the UL resources reserved for the first UE and the UL resources reserved for the second UE; and
- transmitting a Radio Resource Control (RRC) message comprising the aggregated uplink information.

7. The method of claim 6, wherein each of the uplink GF configurations comprises one or more parameters that indicate at least one of: the periodicity, a number of configured repetitions, a time domain resource allocation and a frequency domain resource allocation.

8. The method of claim 6, wherein aggregating the uplink GF configurations comprises:
- sorting the uplink GF configurations according to predetermined criteria.

9. The method of claim 6, wherein transmitting the aggregated uplink configuration comprises transmitting the aggregated uplink information to an individual UE.

10. The method of claim 6, wherein the uplink GF configurations are allocated for ultra-reliable low latency communication transmission.

11. The method of claim 6, wherein each of the two or more first UEs are capable of URLLC transmission.

12. A first wireless device, comprising:
- a receiver for receiving, from a network node, a Radio Resource Control (RRC) message addressed to the first wireless device, the RRC message comprising aggregated uplink information comprising information indicating a first set of reserved uplink (UL) resources that are not available for use by the first wireless device;
- memory; and
- processing circuitry coupled to the memory, wherein the first wireless device is configured to configure an uplink transmission based on the aggregated uplink information.

13. A network node, comprising:
- memory; and
- processing circuitry coupled to the memory, wherein the network node is configured to perform a method comprising:
  - obtaining a first uplink (UL) grant free (GF) configuration for a first user equipment (UE), wherein the first UL GF configuration indicates UL resources reserved for the first UE;
  - obtaining a second uplink (UL) grant free (GF) configuration for a second user equipment (UE), wherein the second UL GF configuration indicates UL resources reserved for the second UE;
  - aggregating the first and second UL GF configurations to form aggregated UL information, wherein the aggregated UL information indicates an aggregated set of reserved UL resources, and the aggregated set of reserved UL resources includes the UL resources reserved for the first UE and the UL resources reserved for the second UE; and
  - transmitting a Radio Resource Control (RRC) message comprising the aggregated uplink information.

14. The method of claim 1, wherein the information specifies that the first set of UL resources are not available for use by the first wireless device by indicating that the first set of UL resources are reserved for a wireless device other than the first wireless device.

15. The method of claim 6, wherein
- the UL resources reserved for the first UE are not available for use by the second UE, and
- the UL resources reserved for the second UE are not available for use by the first UE.

16. The method of claim 1, wherein the RRC message is addressed solely to the first wireless device.

* * * * *